(12) United States Patent
Tian et al.

(10) Patent No.: US 10,254,632 B2
(45) Date of Patent: Apr. 9, 2019

(54) HANDHELD STAND FOR SHOOTING AND METHOD FOR ADJUSTING CENTER OF GRAVITY THEREOF

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan (CN)

(*) Notice: Subject to any disclaimer, the term of this patent is extended or adjusted under 35 U.S.C. 154(b) by 0 days.

(21) Appl. No.: 15/855,204

(22) Filed: Dec. 27, 2017

(65) Prior Publication Data

US 2018/0188637 A1    Jul. 5, 2018

(30) Foreign Application Priority Data

Dec. 29, 2016 (CN) .......................... 2016 1 1245375
Dec. 29, 2016 (CN) .......................... 2016 1 1245378
Dec. 29, 2016 (CN) .......................... 2016 1 1247134
Dec. 29, 2016 (CN) .......................... 2016 1 1248504
Dec. 29, 2016 (CN) .......................... 2016 1 1248575
Dec. 29, 2016 (CN) .................... 2016 2 1465558 U (Continued)

(51) Int. Cl.
*F16M 11/04* (2006.01)
*F16M 13/00* (2006.01)
(Continued)

(52) U.S. Cl.
CPC ............ *G03B 17/561* (2013.01); *F16M 13/04* (2013.01); *G03B 17/563* (2013.01); *F16M 11/04* (2013.01);
(Continued)

(58) Field of Classification Search
CPC ....................................................... F16M 13/04
(Continued)

(56) References Cited

U.S. PATENT DOCUMENTS 4,946,272 A * 8/1990 Brown ................... F16M 13/04
                                                                352/243
5,098,182 A * 3/1992 Brown ................... F16M 13/04
                                                                224/908

(Continued)

*Primary Examiner* — Clayton E. LaBalle
*Assistant Examiner* — Kevin C Butler
(74) *Attorney, Agent, or Firm* — Law Offices of Liaoteng Wang

(57) ABSTRACT

The present disclosure relates to the technical field of shooting and discloses a handheld stand for shooting which is more stable. The present disclosure comprises a rotatable handle mechanism, a base, a position adjusting mechanism, a connecting mechanism and a counterweight, wherein the rotatable handle mechanism is connected to a bottom of the base, the base is rotatable with respect to the rotatable handle mechanism, the position adjusting mechanism is disposed on an upper surface of the base for holding a shooting device and adjusting a position of the shooting device relative to the base, the counterweight is disposed below the rotatable handle mechanism and connected to the base via the connecting mechanism, and the counterweight is configured to adjust a center of gravity of the base. The present disclosure further discloses a method for adjusting the center of gravity of a handheld stand.

20 Claims, 18 Drawing Sheets

(30) Foreign Application Priority Data

| Dec. 29, 2016 | (CN) | .................... | 2016 2 1465600 U |
| Dec. 29, 2016 | (CN) | .................... | 2016 2 1466910 U |
| Dec. 29, 2016 | (CN) | .................... | 2016 2 1466928 U |
| Dec. 29, 2016 | (CN) | .................... | 2016 2 1466929 U |
| Dec. 29, 2016 | (CN) | .................... | 2016 2 1466930 U |
| Dec. 29, 2016 | (CN) | .................... | 2016 2 1467956 U |

(51) Int. Cl.
    *F16M 13/04*     (2006.01)
    *G03B 17/56*     (2006.01)

(52) U.S. Cl.
    CPC ....... *F16M 13/00* (2013.01); *F16M 2200/041* (2013.01)

(58) Field of Classification Search
    USPC .......................................................... 396/421
    See application file for complete search history.

(56) References Cited

U.S. PATENT DOCUMENTS

| 9,778,547 | B1* | 10/2017 | Wei ...................... | G03B 17/561 |
| 2006/0262274 | A1* | 11/2006 | Brown .................. | F16M 13/04 |
| | | | | 352/243 |
| 2006/0285844 | A1* | 12/2006 | Hershenzon ........... | F16M 13/04 |
| | | | | 396/421 |
| 2009/0257741 | A1* | 10/2009 | Greb ...................... | F16M 13/04 |
| | | | | 396/55 |
| 2010/0172642 | A1* | 7/2010 | Orf ....................... | F16M 11/041 |
| | | | | 396/421 |
| 2010/0238345 | A1* | 9/2010 | Greb .................... | F16M 11/125 |
| | | | | 348/373 |
| 2011/0164173 | A1* | 7/2011 | Orf ....................... | H04N 5/2252 |
| | | | | 348/376 |
| 2011/0249964 | A1* | 10/2011 | Wood .................... | F16M 11/10 |
| | | | | 396/421 |
| 2014/0205276 | A1* | 7/2014 | Johnston .............. | G03B 17/561 |
| | | | | 396/421 |
| 2014/0211975 | A1* | 7/2014 | Roberts ................ | G03B 17/561 |
| | | | | 381/361 |
| 2015/0071627 | A1* | 3/2015 | Hoang .................. | F16M 13/00 |
| | | | | 396/421 |
| 2016/0201847 | A1* | 7/2016 | Firchau ................ | F16M 11/041 |
| | | | | 224/567 |
| 2016/0381271 | A1* | 12/2016 | Cheng .................. | F16M 11/041 |
| | | | | 348/208.2 |
| 2017/0108161 | A1* | 4/2017 | Zhao ..................... | B64D 47/08 |
| 2017/0108168 | A1* | 4/2017 | Pan ...................... | F16M 11/04 |
| 2017/0131623 | A1* | 5/2017 | Zhou ..................... | F16M 13/02 |
| 2017/0138534 | A1* | 5/2017 | Chen ..................... | F16M 11/10 |
| 2017/0146892 | A1* | 5/2017 | Wei ...................... | F16M 11/045 |
| 2017/0198747 | A1* | 7/2017 | Chen ..................... | B64D 47/08 |
| 2017/0227834 | A1* | 8/2017 | Zhao ..................... | F16M 11/045 |
| 2017/0241589 | A1* | 8/2017 | Wang .................... | F16M 11/18 |
| 2017/0261157 | A1* | 9/2017 | Guo ...................... | F16M 11/123 |
| 2018/0023752 | A1* | 1/2018 | Tian ..................... | F16M 13/04 |
| | | | | 348/376 |
| 2018/0031951 | A1* | 2/2018 | Wang .................... | G03B 17/561 |
| 2018/0188637 | A1* | 7/2018 | Tian ..................... | G03B 17/561 |

\* cited by examiner

HANDHELD STAND FOR SHOOTING AND METHOD FOR ADJUSTING CENTER OF GRAVITY THEREOF

CROSS-REFERENCE TO RELATED APPLICATION

This application claims priority to Chinese Patent Application No. 201621466930.7, No. 201611248575.0, No. 201621465600.6, No. 201611247134.9, No. 201621466929.4, No. 201621466910.X, No. 201611248504.0, No. 201611245375.X, No. 201621466928.X, No. 201621467956.3, No. 201611245378.3 and No. 201621465558.8, all of which are filed on Dec. 29, 2016 and all of which are hereby incorporated by reference in its entirety.

TECHNICAL FIELD

The present disclosure relates to the technical field of camera shooting, and particularly relates to a handheld stand technology.

BACKGROUND

As the performance of digital products continues to increase, portable digital products, such as smart phones, have been widely used for camera shooting and photographing. General users use handheld smart phones for shooting. However, hand shaking is likely to occur, resulting in blurred images. Especially when shooting night scenes, a longer exposure time is required, and a slight hand shaking will result in image blur. The problem of hand shaking is especially serious if it is on a moving transport, such as a car or a train.

In order to solve the problem of hand shaking, engineers have developed a handheld stand, in which a direction and amplitude of the hand shaking are detected by a gyroscope, an acceleration sensor and the like, and compensates for hand shaking is provided by a control circuit driving a motor.

SUMMARY

However, The inventor of the present disclosure has found that there are some limitations on a location design of each component of the handheld stand, resulting in that a center of gravity of the handheld stand is usually located at a handle or above the handle, which is disadvantageous for the handheld stand to achieve a balance quickly and effectively, and is disadvantageous for maintaining a stability, resulting in a poor user experience. Therefore, there is an urgent need for a handheld stand that can perform a balance adjustment more quickly and effectively and can better maintain the stability.

Additionally, the inventor of the present disclosure has also found that, in order to be able to hold photographing devices, such as smart phones, and meanwhile to achieve the balance adjustment, the current handheld stand requires a combination of multiple components in the design and assembly process, resulting in a larger volume of the handheld stand, which is not portable and leads to a poor user experience. Therefore, there is an urgent need for a smaller and more portable handheld stand.

Additionally, the inventor of the present disclosure has also found that, as the current handheld stand is usually balanced by a stationary weight structure, it is not easy to adjust when shooting devices with different weights are held, the balance adjustment is less effective. Such handled stand has a poor adaptability to different shooting device, resulting in a poor user experience. Therefore, there is an urgent need in the field for a handheld stand that has a better adaptability to shooting devices with different weights to be carried and has a better balance adjustment effect.

Additionally, the inventor of the present disclosure has found that a position of a center of gravity of the current handheld stand is generally constant and cannot be adjusted freely. However, the smart phones held on the stand often has greatly different size and weight, which results in that the balance adjustment of the handheld stand is less effective, and thereby more torque should be output from the motor of the handheld stand to achieve a balance, weakening a compensation capability for the hand shaking and increasing a power consumption.

Additionally, a selfie stick appears, in order to make it easier for the user to photograph using a shooting device, such as the smart phone (for example, the shooting is performed at a position of a certain height or distance with respect to the selfie person and the hand shaking is avoided). The selfie stick is mainly composed of a rod, a holder, a Bluetooth remote control self timer or a bottom button. The holder can hold a phone, a camera and even a tablet PC. A freely adjustable telescopic rod brings a wider shooting angle. An operation can be controlled by a Bluetooth button at a bottom of the rod.

However, there are some shortcomings that need to be solved regarding the selfie stick. For example, the selfie stick cannot be well stabilized, and a shooting effect is often affected when an operator moves or shakes his/her hands.

Therefore, there is an urgent need in the market for a better carrying device for more effectively maintaining the stability of a shooting device, such as the smart phone, and reducing an influence of an operator's hand shaking to ensure a shooting effect.

In addition, more and more handheld stands employs foldable structures for easy storage and carrying. However, the conventional foldable structures have many problems, such as short life, poor stability, inability to perform a lockable rotation and the like. Therefore, there is an urgent need for a better foldable structure, which can perform a lockable rotation with longer service life and better stability.

In addition, the inventor of the present disclosure found that, although when the handheld stand has a certain offset of a center of gravity, corresponding motors can be automatically driven according to information output by a gyroscope to adjust an attitude of the handheld stand so that the handheld stand is always in a balance, such balance state balance depends on a larger torque output of motors. Motors in such state will produce more heat, while continuing to consume electricity. It is therefore necessary to adjust the center of gravity to a state almost without offset. In addition, in the future, there will be a gravity center adjustment component such as a counterweight on the handheld stand. However, due to the existence of an automatic balancing system on the handheld stand, it is difficult to know exactly in which direction and how much the center of gravity shall be adjusted. Therefore, there is a need for a method of adjusting center of gravity, to quickly adjust a handheld stand to a balance state with a motor torque as small as possible.

An aspect of the present disclosure provides a handheld stand for shooting, characterized in comprising a rotatable handle mechanism, a base, a position adjusting mechanism, a connecting mechanism and a counterweight; wherein the rotatable handle mechanism is connected to a bottom of the base, and the base is rotatable with respect to the rotatable handle mechanism; the position adjusting mechanism is disposed on an upper surface of the base for holding a shooting device and adjusting a position of the shooting device relative to the base; the counterweight is disposed below the rotatable handle mechanism and connected to the base via the connecting mechanism, and the counterweight is configured to adjust a center of gravity of the base.

Another aspect of the present disclosure provides a method for adjusting a center of gravity of a handheld stand, comprising steps of: sending torque information of motor(s) in a balance state to a mobile terminal after the handheld stand is balanced; displaying the received torque information of motor(s) by the mobile terminal; adjusting a counterweight of the handheld stand to change a position of the center of gravity of the handheld stand according to the torque information of motor(s) displayed by the mobile terminal; and repeatedly performing the above steps at least once so that absolute value(s) of the torque information of motor(s) displayed by the mobile terminal becomes smaller.

It is to be understood that within the scope of the present disclosure, various technical features of the present disclosure described above and technical features described in the following (such as embodiments and examples) may be combined with each other to form a new or preferred technical solution, and will not be described due to space limitations.

Figure 1:
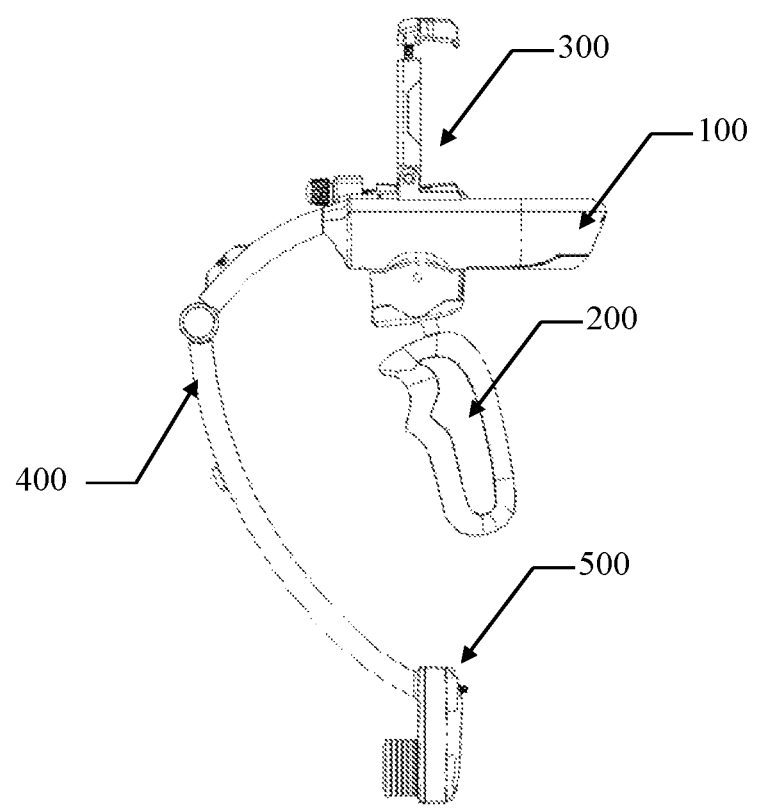
FIG. 1 is a schematic structural view of a handheld stand according to an embodiment of the present disclosure.

Main reference numbers in the drawings of the present disclosure:

100 Base
200 Rotatable handle mechanism (abbreviated as "handle")
300 Position adjusting mechanism
400 Connecting mechanism
500 Counterweight
201 Handle housing
211 Rotatable shaft
212 Head
213 Opening
214 Flake
2120 Chamber defined by a head
2121-2124 Wall of a head
215 Rolling motor
216 Transmission pinion
217 Through hole
218 Reinforcement
219 Columnar bearing
221 Gasket
222 Motor cover
223 Horizontal motor
224 Shaft fixing mechanism
2241 Sleeve
2242 Fastening bolt
2243 Nut
111 Supporting plate
112 Base housing
1121 Small motor bracket
11211 Connecting hole
11212 Carrier
11213 Extended bracket
113 Rotating mechanism
1131 First transmission gear ring
1132 Second transmission gear ring
1133, 1134 Gear supporting frame
1135 Extended frame
1136 Axial hole
114 Power supply system
115 Pitching motor
311 Groove member
312 Rail
313 Blocking plates
314 Length readable zone
315 Fixing platform
3151 Base portion
3152 Projection
3153 Hole 3154 Inclined boss
316 Device holding plate
318 Clamping member
3181 Hook
3182 Supporting portion
319 Spring connector
321 Groove
322 Knob
411 Connecting rod
4111 First connecting rod
4112 Second connecting rod
402 First connecting sheet
401 Middle connecting sheet
403 Second connecting sheet
412 Stabilizing piece
413 Pivoting mechanism
4131 Locking assembly
41311 Elastic piece
41312 Ring piece with depressions
41313 Ring piece with protrusions
511 Weight
512 Counterweight housing
5121 Covering housing
5122 Carrying portion
51221 First member
51222 Second member
51223 Rail
5131 Adjusting knob
5132 Adjusting rod
5133 Adjusting block
10 Base
20 Rotatable handle mechanism
30 Position adjusting mechanism
40 Foldable rod
50 Battery module
41 External knob
51 Supporting shell
52 Adjustment knob
53 Battery supporting bracket
54 Adjusting block
55 Adjusting rod
56 Contact spring
57 Battery
58 Supporting plate

DETAILED DESCRIPTION

In the following description, numerous technical details are set forth to provide a reader with a better understanding of the present disclosure. However, those skilled in the art can understand that, the technical solution claimed in the present application can also be implemented based on various changes and modifications of the following embodiments even without these technical details.

To make the objects, technical solutions, and advantages of the present disclosure clearer, embodiments of the present disclosure are further described in detail below with reference to the drawings.

In the following embodiments, an overall structure of a handheld stand will be described at first, and then respective components will be described separately.

Overall Structure

Figure 2:
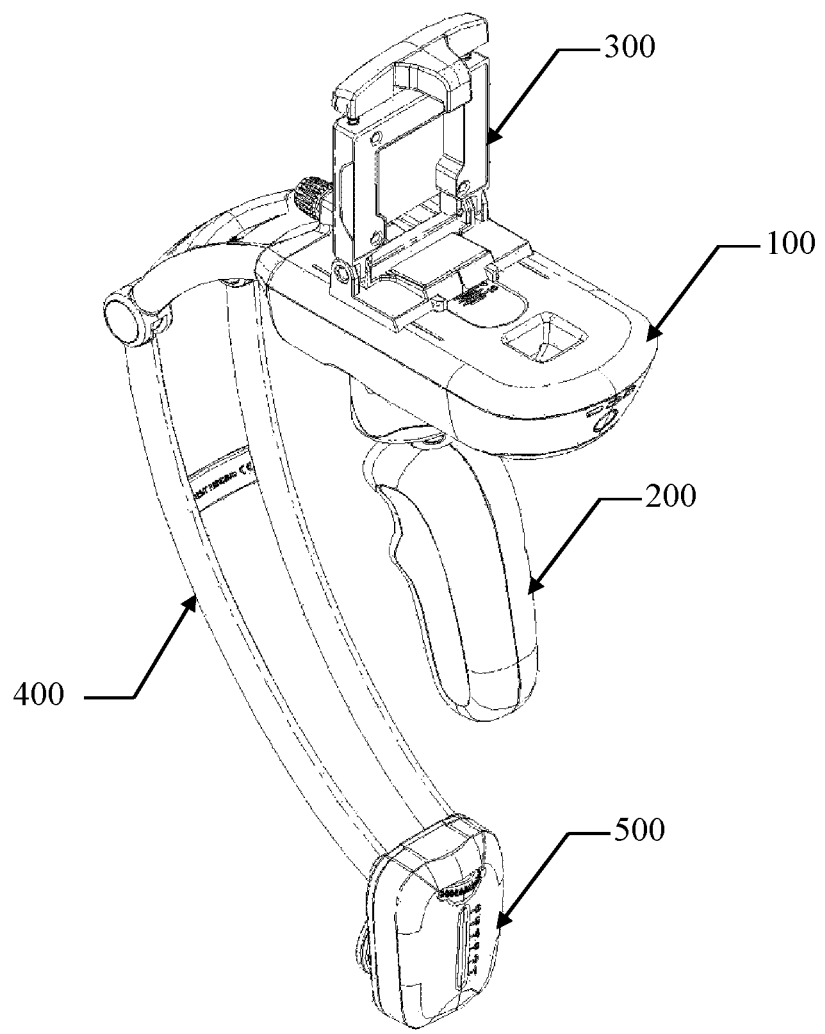
FIG. 2 is a perspective view of a handheld stand according to an embodiment of the present disclosure.

FIG. 1 and FIG. 2 are schematic structural diagrams of a handheld stand according to an embodiment of the present disclosure. As shown in FIG. 1 and FIG. 2, the handheld stand includes a base 100, a rotatable handle mechanism 200, a position adjusting mechanism 300, a connecting mechanism 400 and a counterweight 500.

Figure 3:
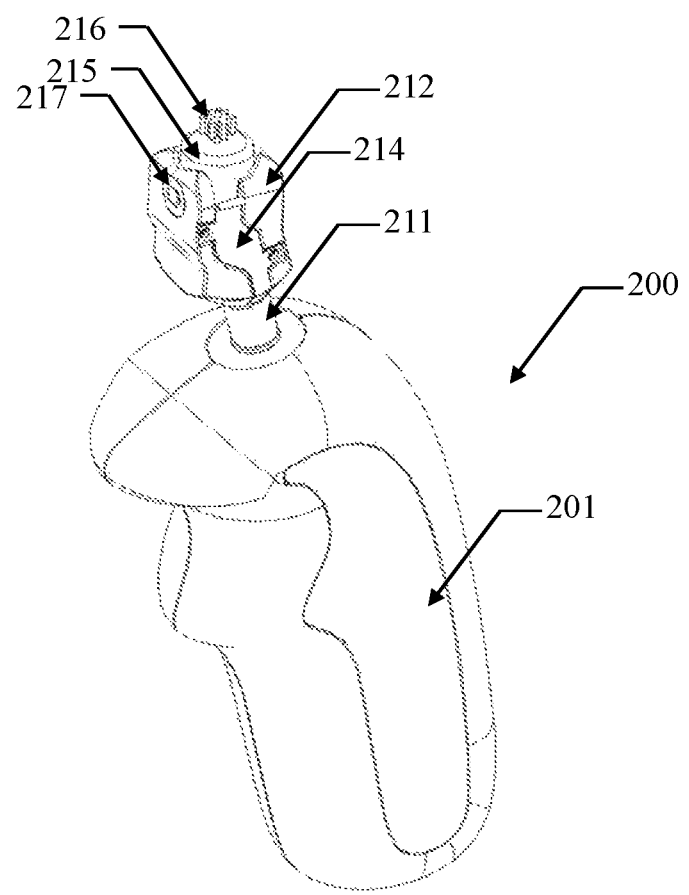
FIG. 3 is a schematic structural view of a rotatable handle mechanism 200 according to an embodiment of the present disclosure.
Figure 8:
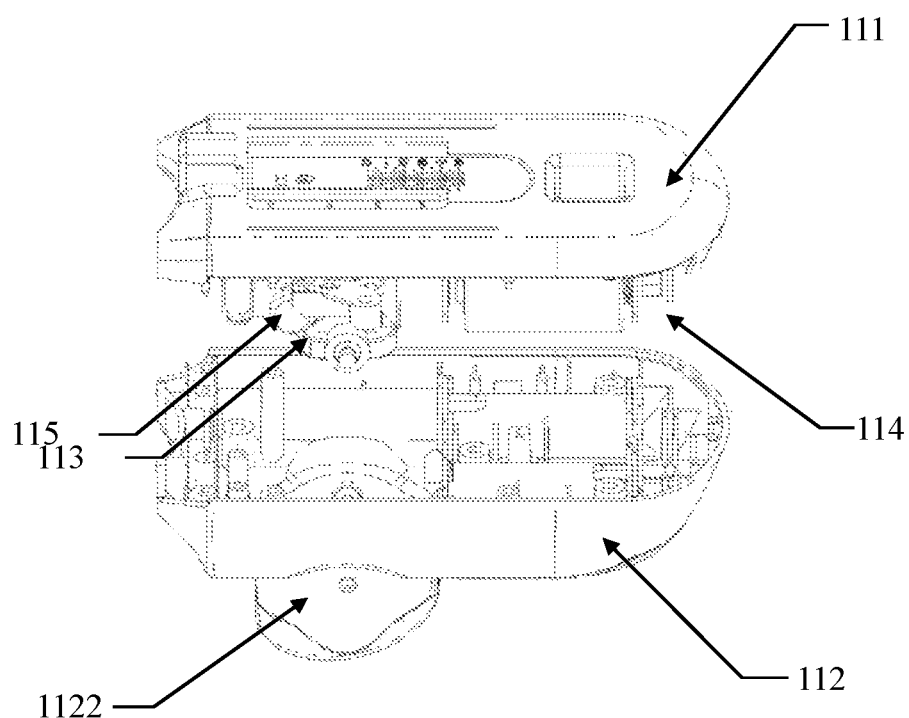
FIG. 8 is a schematic structural view of a base according to an embodiment of the present disclosure.

The rotatable handle mechanism 200 includes a handle housing 201 and a rotatable shaft 211 partially inserted into the handle housing 201 (as shown in FIG. 3), and the rotatable handle mechanism 200 is located below the base 100 and supports the base 100 through the rotatable shaft 211. As shown in FIG. 8, the base 100 includes a supporting plate 111, a base housing 112, and a circuit system disposed inside the base housing 112. The position adjusting mechanism 300 is disposed on the supporting plate 111 for holding a shooting device and adjusting a position of the shooting device relative to the supporting plate 111. The counterweight 500 is disposed below the rotatable handle mechanism 200 and connected to the base 100 through the connecting mechanism 400. The counterweight 500 is configured to adjust a center of gravity of the base 100.

The counterweight 500 is disposed below the rotatable handle mechanism 200 and connected to the base 100 through the connecting mechanism 400, and thus can greatly lower the center of gravity of the handheld stand and make the handheld stand to be more stable. Moreover, by the counterweight and the position adjusting mechanism, the center of gravity of the handheld stand can be further finely adjusted, and the torque and power consumption of an automatic balancing servo motor system in a balance state can be reduced.

Respective components of the handheld stand of the present disclosure will be further described with reference to the drawings. The components are described in an order from near to far distanced from a hand. Details of the rotatable handle mechanism 200 will be described at first, and then details of the base 100 will be described. After that, details of the position adjusting mechanism 300 will be described, and then details of the connecting mechanism 400 will be described. Details of the counterweight 500 will be described at last. Details of important subcomponents are placed in the description of the components to which they belong.

Rotatable Handle Mechanism 200

FIG. 3 is a schematic structural diagram of a rotatable handle mechanism 200 according to an embodiment of the present disclosure. As shown in FIG. 3, the rotatable handle mechanism 200 includes a handle housing 201, a motor disposed inside the handle housing 201 and a rotatable shaft mechanism partially inserted into the handle housing 201. As shown in FIG. 2, the rotatable handle mechanism 200 is installed below the base 100 and is connected with the base 100 through the rotatable shaft mechanism. Components of the rotatable handle mechanism are further described below.

As shown in FIG. 3, the rotatable shaft mechanism includes a rotatable shaft 211, a flake 214, a head 212 having a cavity, a rolling motor 215 disposed within the cavity, and a transmission pinion 216 mounted on an output shaft of the rolling motor 215. The rotatable shaft 211 is partially inserted into and fixed inside the handle housing 201, the head 212 has a hollow cavity to accommodate the rolling motor 215, and the head 212 has a through hole 217 for further fastening assembly, which runs through the hollow cavity.

Figure 4:
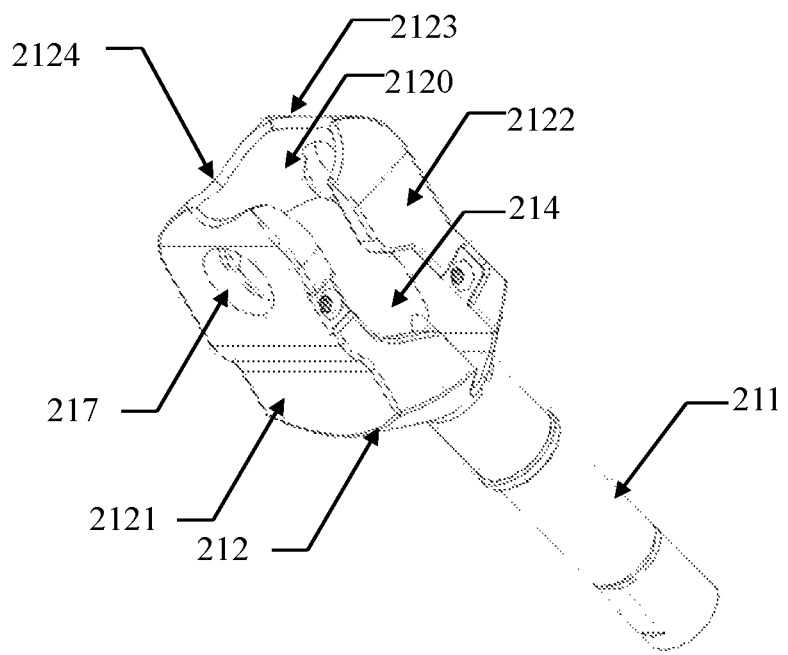
FIG. 4 and FIG. 5 are schematic structural views of a head of a rotatable shaft mechanism from different directions according to an embodiment of the present disclosure.
Figure 5:
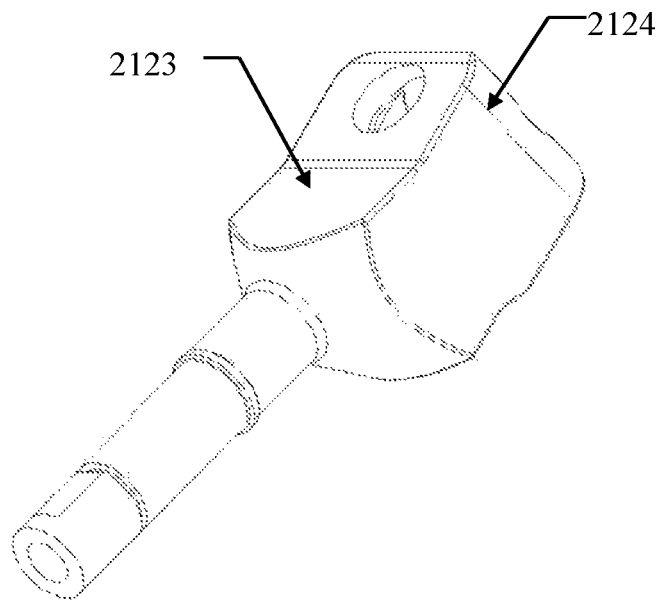

FIG. 4 and FIG. 5 are schematic structural views of a head of a rotatable shaft mechanism according to an embodiment of the present disclosure. Specifically, the head 212 is provided at one end of the rotatable shaft 211. The head 212 is formed as a substantially cuboid body having two pairs of substantially parallel walls 2121 and 2123 and walls 2122 and 2124, and the walls 2121-2124 define a head cavity in a substantially cylindrical shape for accommodating the rolling motor. Each of the walls 2121-2124 has a predetermined thickness, wherein each of the walls 2121 and 2123 is provided with a circular through hole, and the two circular holes are symmetrical to each other (i.e., axes of the two circular through holes coincide with each other) and configured for further assembly. The flake 214 is provided on a wall perpendicular to one pair of parallel walls. In the present embodiment, the flake 214 is inserted into the wall 2122, and the wall 2122 has an opening having a consistent shape with the flake 214, for placing the flake 214. In order to fix the flake 214, the flake 214 can be fitted to the opening and fixed on the wall 2122 by screws. The flake 214 corresponds to an inlet/outlet for loading/unloading the rolling motor 215.

Figure 6:
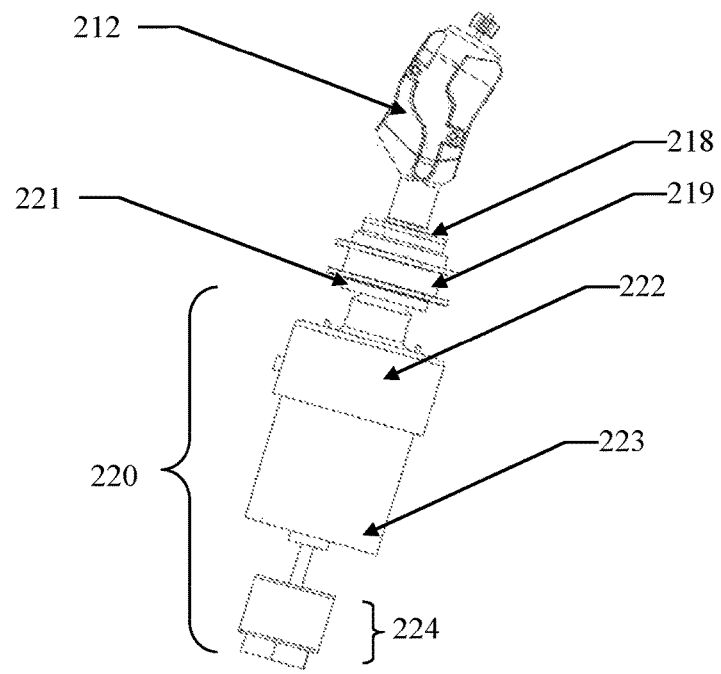
FIG. 6 is a schematic structural view of a rotatable shaft mechanism according to an embodiment of the present disclosure.

FIG. 6 is a schematic structural diagram of a rotatable shaft mechanism according to an embodiment of the present disclosure. In addition to the components of the rotatable shaft mechanism shown in FIGS. 3 to 5, the rotatable shaft mechanism in FIG. 6 further includes a connecting member for connecting the handle housing 201 and the rotatable shaft mechanism, and a motor system 220 connected to the rotatable shaft and arranged inside the handle housing. Specifically, the connecting member includes reinforcements 218 and a columnar bearing 219. The columnar bearing 219 is mounted on the rotatable shaft 211, and the reinforcements 218 are respectively mounted at both ends of the columnar bearing 219. The reinforcements 218 are configured to define and fix a position of the columnar bearing 219. The columnar bearing 219 has multiple regular protrusions. The handle housing 201 is provided with multiple depressions shaped corresponding to the protrusions. Therefore, a part of the rotatable shaft mechanism can be enclosed inside the handle housing 201 by engagement of the multiple depressions on the handle housing with the multiple protrusions on the columnar bearing.

As shown in FIG. 6, the motor system 220 includes a motor cover 222, a horizontal motor 223, and a shaft fixing mechanism 224. The motor cover 222 is configured to connect the rotatable shaft 211 and the horizontal motor 223 to transmit a mechanical energy generated by the horizontal motor 223 to the rotatable shaft 211. Therefore, a tail portion of the horizontal motor 223 is partially mounted within the motor cover 222. Specifically, the motor cover 222 is a stepped cylindrical member having a small cylinder with an inner diameter D1 and a large cylinder with an inner diameter D2, and the small cylinder is coaxial with and can be integrally formed with the large cylinder. The tail of the horizontal motor 223 is mounted into the large cylinder and there can be an interference fit between them. The rotatable shaft 211 is mounted into the small cylinder, and a gasket 221 is provided between an upper end of the small cylinder and the columnar bearing 219 to reduce a vibration between the rotatable shaft 211 and the horizontal motor 223. The horizontal motor 223 is disposed at a bottom of the rotatable shaft 211 to control a rotation of the base 100 in a horizontal direction.

Figure 7:
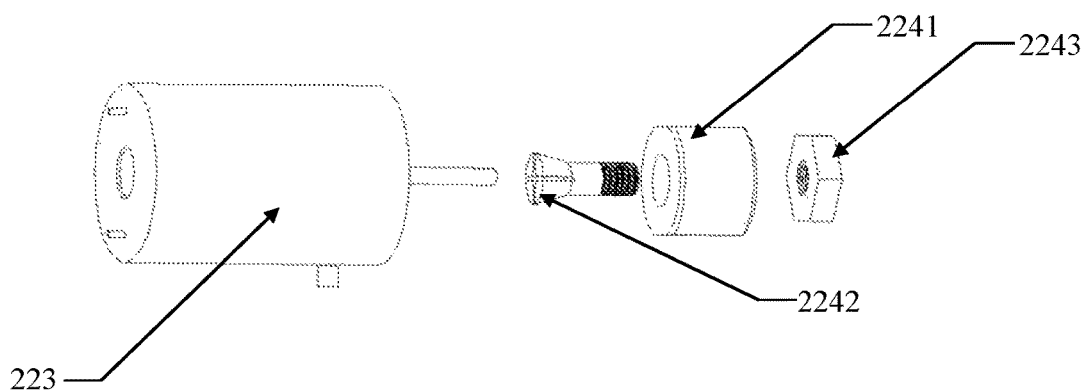
FIG. 7 is an exploded view of an assembly of a horizontal motor and a shaft fixing mechanism according to an embodiment of the present disclosure.

FIG. 7 is an exploded view of an assembly of a horizontal motor and a shaft fixing mechanism according to an embodiment of the present disclosure. As shown in FIG. 7, the shaft fixing mechanism includes a sleeve 2241, a fastening bolt 2242 and a nut 2243. A first portion of the fastening bolt 2242, which is formed in a shape of a truncated cone and does not have a threaded region, is configured to be connected into the sleeve 2241. A second portion of the fastening bolt 2242, which is threaded, is configured to be connected with the nut 2243. A shaft of the horizontal motor 223 is connected to the sleeve 2241 by being mounted into the first portion of the fastening bolt 2242, and is covered by the nut 2243 so as to be protected from being damaged.

Base 100

In the overall structure of the handheld stand as shown in FIG. 1, the base 100 is located above the rotatable handle mechanism 200 (abbreviated as "handle"), and the handle is configured to support the base 100 and can rotate about the base 100 by an angle more than 360 degrees. The base 100 is configured to support a shooting device, a shooting angle of which can be changed by an angle in horizontal, pitching, and rolling directions.

FIG. 8 is a schematic structural diagram of a base according to an embodiment of the present disclosure. The base 100 includes a supporting plate 111, a base housing 112, and a rotating mechanism 113, a pitching motor 115, and a power supply system 114 mounted within the base housing 112. As shown in FIG. 8, the rotating mechanism 113 and the power supply system 114 are fixed on the supporting plate 111, facing the base housing 112. The base housing 112 further has a cylindrical cavity 1122, which is configured to enclose the head 212 of the rotatable handle mechanism and the rolling motor 215 disposed in the head 212. The pitching motor 115 and the rotating mechanism 113 cooperate with each other to control a rotation angle of the supporting plate 111 in a pitching direction. The specific cooperating relationship will be described later.

Figure 9:
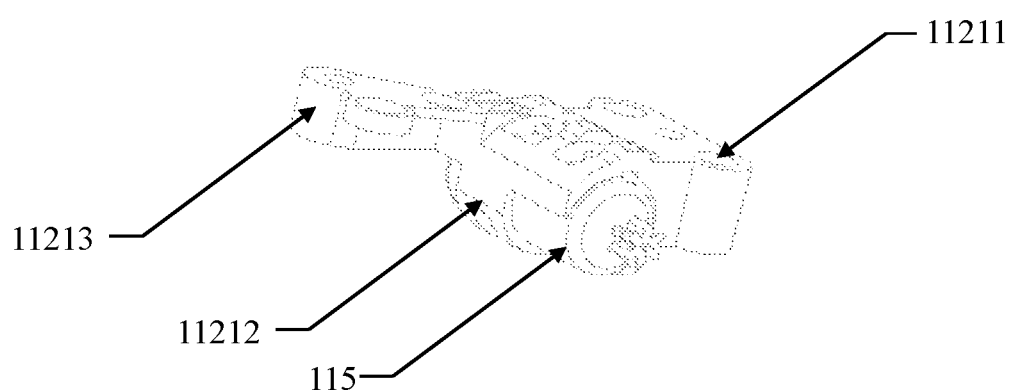
FIG. 9 is an assembled view of a motor bracket 1121 and a pitching motor 115 in the embodiment shown in FIG. 8.

The pitching motor 115 is fixed inside the base housing 112 by a motor bracket 1121. FIG. 9 is an assembly view of the motor bracket 1121 and the pitching motor 115 according to the embodiment shown in FIG. 8. As shown in FIG. 9, the motor bracket 1121 includes a connecting hole 11211, a carrier 11212, and an extended bracket 11213. A fixing member (such as a screw or a bolt) penetrates through the connecting hole 11211 and engages with a hole on an inner surface of the base housing to fix the motor bracket. The carrier 11212 is formed in a cylindrical shape and has a volume slightly larger than that of the pitching motor 115, which is placed inside the carrier 11212. In a preferred embodiment, an axis of the connecting hole 11211 is designed to be perpendicular to that of the carrier 11212.

Figure 10:
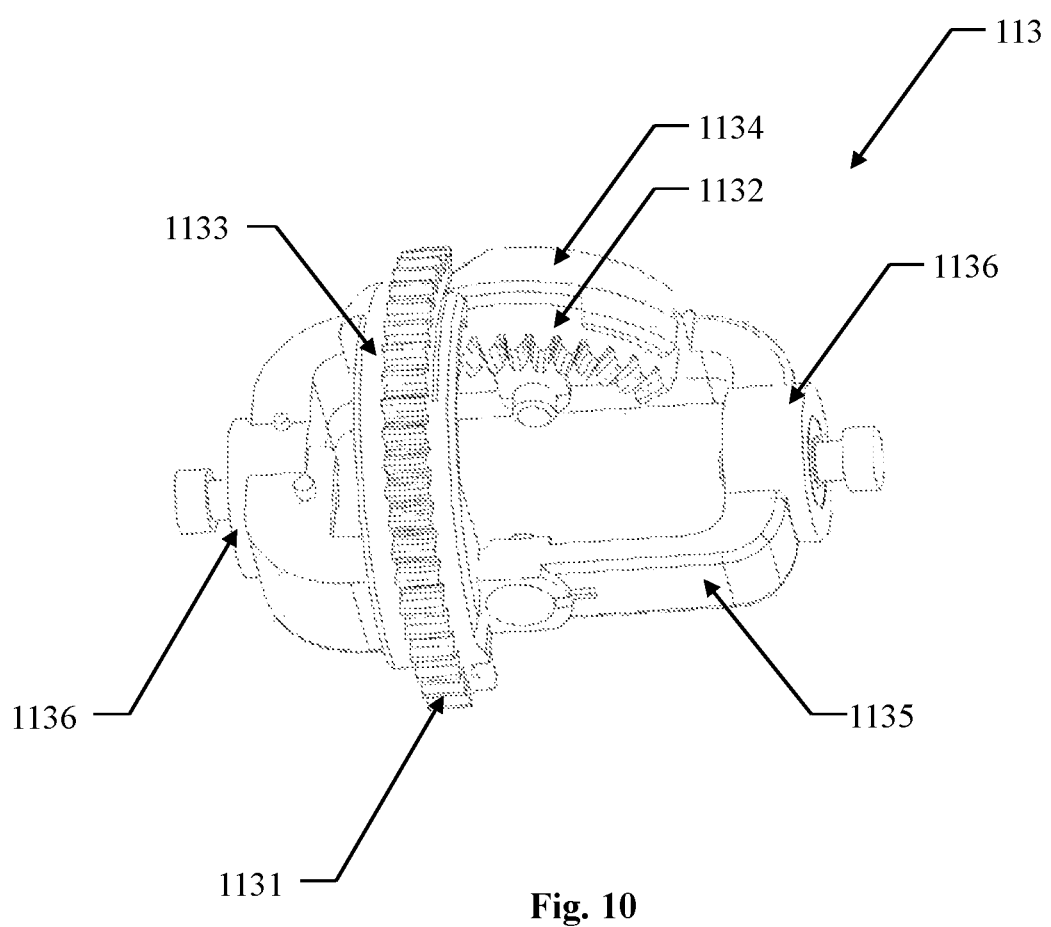
FIG. 10 is a schematic structural view of the rotating mechanism 113 in the embodiment shown in FIG. 8.

The rotating mechanism 113 includes a transmission gear ring group, a gear fixture, and a pitching motor connectors. FIG. 10 is a structural schematic view of the rotating mechanism 113 according to the embodiment shown in FIG. 8. Specifically, the transmission gear ring group includes a first transmission gear ring 1131 and a second transmission gear ring 1132, axes of which are perpendicular to each other. A shaft of the pitching motor 115 is mounted with a transmission pinion, which can engage with the first gear ring 1131. An axis of the pitching motor 115 is parallel to that of the first gear ring 1131 in an installed state. A transmission direction of a force is changed by the engagement of the transmission pinion with the gear ring 1131.

Further, the first gear ring 1131 is fixedly disposed on the gear fixture. As shown in FIG. 10, the gear fixture includes gear supporting frames 1133, 1134 and an extended frame 1135, wherein the extended frame 1135 is a frame in a substantially rectangular shape, four walls of the extended frame 1135 each has an axial hole 1136 for connecting with a rotatable shaft so as to connect with the head 212, to be specific, the rotatable shafts through the axial holes 1136 can abut against a portion of the four walls 2121 to 2124 of the head 212. A groove is provided in the gear supporting frame 1133, for receiving the first gear ring 1131, and similarly, a groove is provided in the gear supporting frame 1134, for receiving the second gear ring 1132, wherein a reference surface of the gear supporting frame 1133 is perpendicular to that of the gear supporting frame 1134. The first gear ring 1131 and the second gear ring 1132 are fixed to the respective gear fixtures and can be rotated along with the respective gear fixtures. End surface of the second gear ring 1132 is arranged to be perpendicular to that of the first gear ring 1131.

Figure 11:
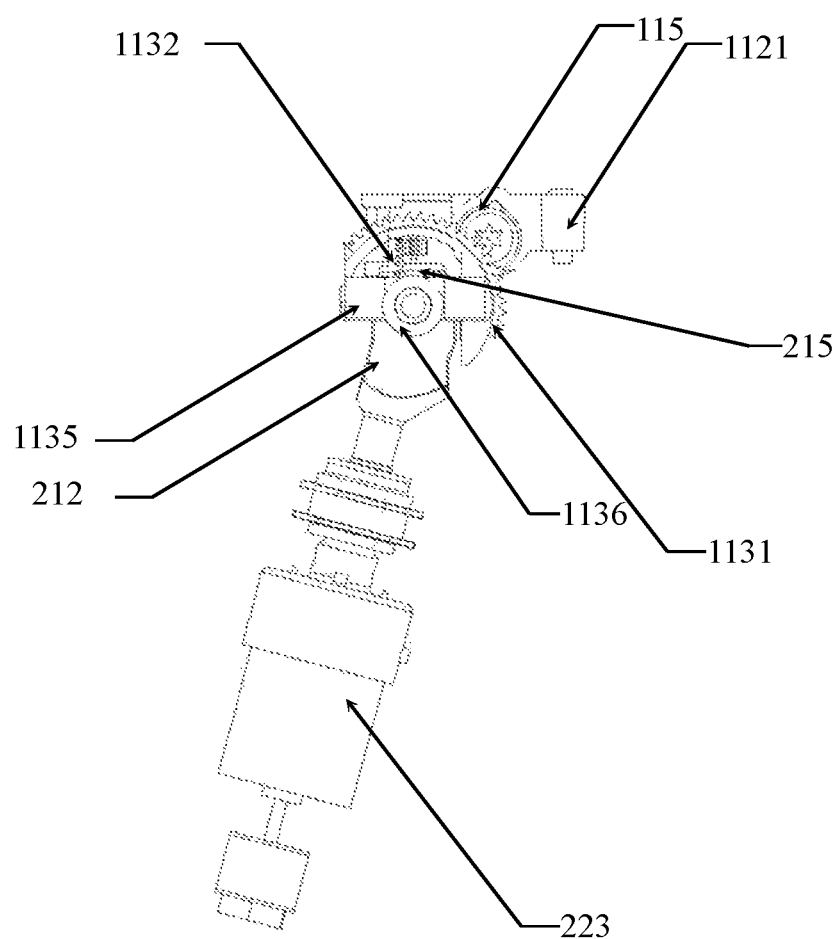
FIG. 11 is an assembly diagram of the rotating mechanism 113, the rotatable handle mechanism 200 and the pitching motor 115 in the embodiment shown in FIG. 8.

FIG. 11 is a schematic assembly view of the rotating mechanism 113, the rotatable handle mechanism 200 and the pitching motor 115 according to the embodiment shown in FIG. 8.

The rotating mechanism 113 is mutually fixed with the rotatable handle mechanism 200 by the rotatable shafts abutting against the head 212, and the rolling motor 215 disposed within the cavity of the head 212 engages with the second gear ring 1132 via the pinion so as to enable the gear fixture to rotate about the head 212 within a space defined by the extended frame 1135. Further, the first gear ring 1131 of the rotating mechanism 113 engages with the pinion mounted on the shaft of the pitching motor 115, so that the pitching motor 115 can transmit a force to the rotating mechanism 113. Further, the motor bracket 1121 can be fixed on the supporting plate 111 by a screw or a fastening shaft passing through the connecting hole 11211.

In a preferred embodiment, the first transmission gear ring 1131 is formed in a sector shape and its central angle may be 135 degrees. The second transmission gear ring 1132 also may be formed in a sector shape and its central angle may be 45 degrees. In other embodiments, the central angle of the first transmission gear ring 1131 may be a value between 120 and 150 degrees, and the central angle of the second transmission gear ring 1132 may be a value between 30 and 60 degrees. One advantage is that the base 100 has a limited movement in both pitching and rolling directions. In other examples, the first and second transmission gear rings may also be complete gears, or sector rings with other central angles.

A three-axis balance assembly consisting of the rotating mechanism, the three motors and other related structures as described above can effectively adjust angles in three mutually perpendicular directions by the three motors so as to achieve a three-axis balance. The assembly can be rotated at any angle in the horizontal direction. Moreover, the angles of the sector-shaped gear rings can be set as required to control the rotatable angles in the other two directions within a certain range, reducing a risk of falling for equipment (such as mobile phones) on the cradle.

The power supply system 114 in the embodiment shown in FIG. 8 may include a set of spacers, a power supply accommodating space defined by the spacers, a power supply supporting surface, and a compression piece. The set of spacers includes at least a key spacer, a power supply head spacer, and a power supply tail spacer. The power supply head spacer and the power supply tail spacer are placed in parallel and define the accommodating space for the power supply. A thickness of the compression piece is greater than that of any one of the spacers and is disposed between the key spacer and the power supply head spacer, so as to reduce a stress concentration of the power supply head spacer applied by an external force. The set of keys includes a main key and an auxiliary key. The main key and the auxiliary key are configured to turn on the power supply system to supply electric power to the small motor of the rotating mechanism. The main key is designed to be mounted to the key spacers. When an external force is applied to press the may key, the main key pushes the key spacer to press the compression piece. As the thickness of the key spacer is much smaller than that of the compression piece, the compression piece can absorb a concentrated stress exerted on the compression piece itself. Then the compression piece presses the power supply head spacer, so that the power supply head spacer turns on the power supply and thereby the power supply system circuit, by cooperating with the power supply tail spacer abutting against the power supply. Further, in order to encase the power supply system within the base housing, the power supply supporting surface is configured to cover the power supply system. Specifically, the power supply supporting surface is arranged in parallel with the supporting plate of the base, and can engage with the base housing in a snap-fit manner, forming a detachable integral structure with the base housing. The power supply system is placed on the power supply supporting surface. The auxiliary key is configured to assist the main key to turn on the power supply system and is set on the same side as the main key.

As shown in FIG. 8, the supporting plate 111 can be configured to support the shooting device, can engage with the base housing 112 to form an integrity on the appearance with the base housing 112, i.e., a base. The supporting plate 111 is formed in a streamlined rectangular shape. Specifically, a surface of the supporting plate 111 facing the stand housing 112 is configured to be fixed with the motor bracket 1121 and the power supply system 114, by way of screw connection, or a key and slot fit.

The base is further provided with a circuit system, which includes an Inertial Measurement Unit (IMU) and a control circuit. The IMU is configured to measure a three-axis attitude angle (or angular velocity) and acceleration of an object. Gyroscopes and accelerometers are main components of the IMU. The control circuit sends control signals to the three motors (the horizontal motor, the rolling motor, and the pitching motor) according to an output of the IMU, so that the three motors can output corresponding electric torques to keep the base in a state of a horizontal balance and a stable attitude. When a hand holding the handle shakes, the control circuit sends control electric signals to the three motors according to an output of the IMU to correspondingly compensate for the shaking of the hand. The three-axis balance algorithm employed by the control circuit has various implementations in the prior art and will not be described in detail here.

Position Adjusting Mechanism 300

Figure 12:
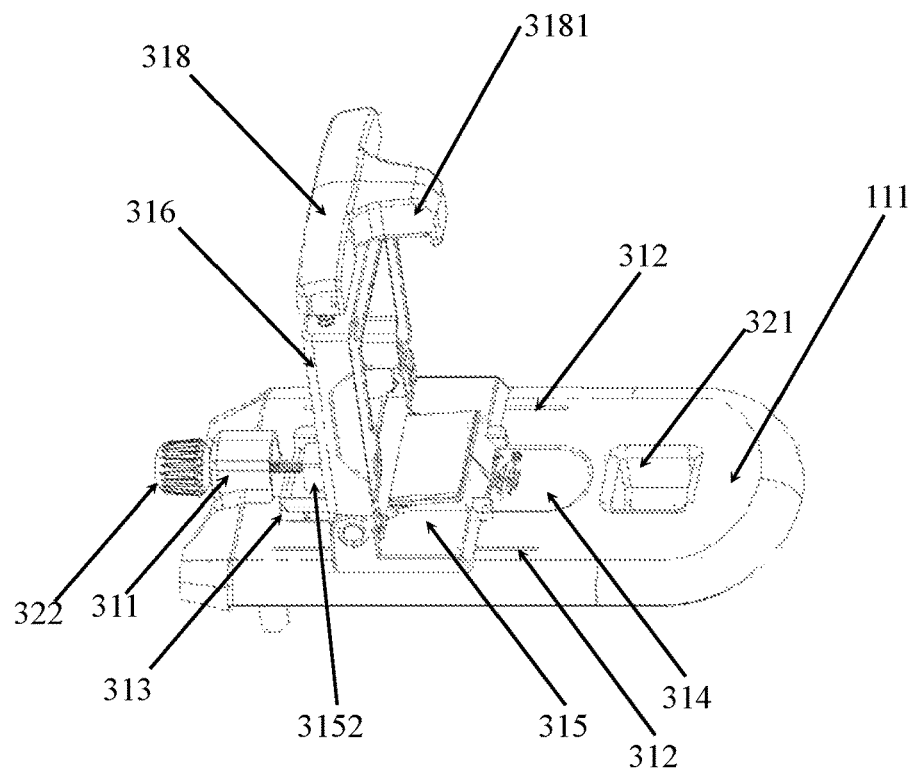
FIG. 12 is a schematic structural view of a position adjusting mechanism 300 according to an embodiment of the present disclosure.

A position adjusting mechanism 300 is provided on the supporting plate 111 for fixing the shooting device. FIG. 12 is a schematic structural view of a position adjusting mechanism 300 according to an embodiment of the present disclosure.

Specifically, the position adjusting structure 300 includes a fixing platform 315, a device holding plate 316 and a knob 322. To fix the position adjusting mechanism 300 on the supporting plate 111, the supporting plate 111 is provided with a groove member 311 at a tail portion, blocking plates 313 and rails 312. As shown in FIG. 12, the supporting plate 111 has a substantially rectangular outer surface, the groove member 311 is provided at the tail portion of the supporting plate for assembling with the knob 322. The groove member is provided with a cuboid cavity and protrudes vertically from the outer surface of the supporting plate, disposed at a center of the tail portion of the supporting plate and symmetrical with respect to a long symmetrical axis of the supporting plate. There are two rails 312 located close to the groove member and symmetrical with respect to the groove member for engaging with the fixing platform 315 and defining a moving trajectory of the fixing platform 315.

Further, as shown in FIG. 12, the blocking plates 313, which are symmetrical about the groove member and parallel to each other, are disposed between the rails 312. The blocking plates 313 protrude upward vertically to the supporting plate 111 and are configured to engage with the fixing platform 315. Therefore, a bottom portion of the fixing platform 315 is further provided with grooves shaped corresponding to the blocking plates 313. In a preferred embodiment, the blocking plates 313 may be provided with a retainer that can be stuck into the grooves on the bottom portion of the fixing platform 315 and hook the bottom portion of the fixing platform 315, so as to prevent the fixing platform 315 from falling off from the supporting plate 111.

Further, a length readable zone 314 is further provided in an area of the supporting plate between the blocking plates 313, for reading a position of a device fixing structure and further adjusting a balance of the base according to the position.

Therefore, the fixing platform 315 can be fixed on the supporting plate 111 via the rails 312 and the blocking plates 313.

Figure 13:
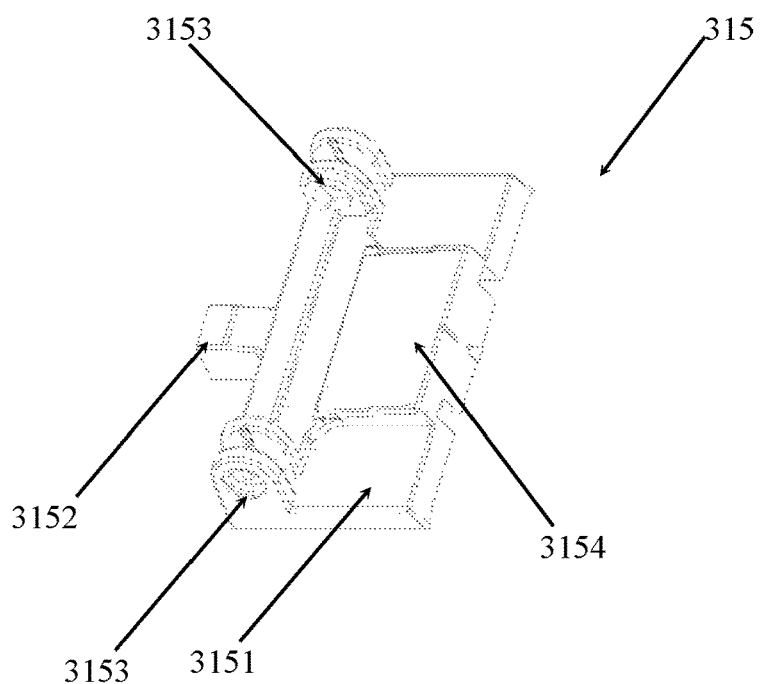
FIG. 13 is a schematic structural view of a fixing platform 315 in the embodiment shown in FIG. 12.

Further, FIG. 13 is a schematic structural view of the fixing platform 315 according to the embodiment shown in FIG. 12. The fixing platform 315 includes a base portion 3151, holes 3153, a projection 3152, and an inclined boss 3154. The base portion is formed as a substantially cuboid shape and has an inclined boss 3154 in the middle, which is symmetrical about a short axis of the base portion. The inclined boss 3154 extends upward perpendicular to an upper surface of the base portion 3151 and has an upper surface which is not parallel to the upper surface of the base portion 3151. Further, a bottom portion of the inclined boss 3154 has grooves for engaging with the blocking plates 313 provided on the supporting plate 111 and forming moving rails of the fixing platform. The holes 3153 are disposed at two opposite ends of the base portion 3151 and are symmetrical about the short axis of the base portion 3151, and are configured to connect the base portion 3151 and the device holding plate 316. Specifically, the holes are formed in a portion extending upward vertically to the upper surface of the base portion 3151. The projection 3152 is formed as a cuboid and has a threaded hole in a center thereof, for cooperating with the knob 322 and the groove member 311 provided at the tail portion of the supporting plate.

As shown in FIG. 11, the device holding plate 316 is mounted to the fixing platform 315 perpendicular to the supporting plate 111 for holding a shooting device, such as a cell phone or the like. The device holding plate 316 is formed as a rectangular plate provided with holes on two opposite ends of a bottom portion, for combining with the holes 3153 of the base portion 3151 to define a relative position of the device holding plate 316 to the fixing platform 315. Further, a top portion of the device holding plate 316 is connected with a clamping member 318, which includes a supporting portion 3182 and a hook 3181 disposed in the middle of the supporting portion 3182. The clamping member 318 is configured to clamp the shooting device against the fixing platform 315 and meanwhile the shooting deceive can be support by the device holding plate 316, being further held.

Figure 14:
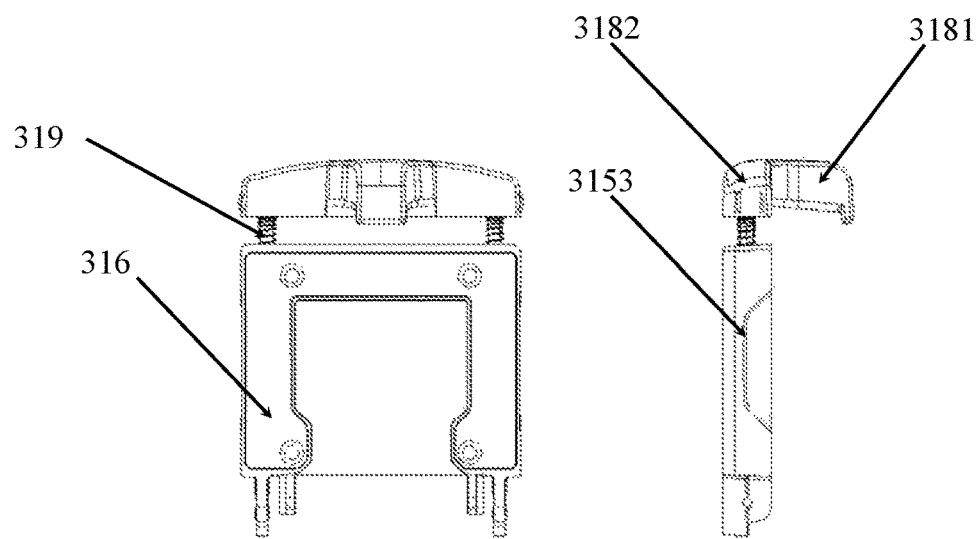
FIG. 14 is a schematic view of a clamping member 318 in the embodiment shown in FIG. 12.

FIG. 14 is a schematic view of the clamping member 318 mounted onto the device holding plate 316 according to the embodiment shown in FIG. 12. The clamping member 318 is connected to the device holding plate 316 via spring connectors 319, which are disposed at two long sides of the device holding plate. In an embodiment, the spring connector comprises a connecting rod and a spring. The connecting rods can be connected on two opposite sides of the clamping member, so that the shooting device can be pressed against the upper surface of the base portion of the fixing platform by changing a displacement distance of the clamping member.

As shown in FIG. 14, in use, one side of the shooting device is stuck to the hook 3181 by pulling out the supporting portion 3182 of the clamping member 318, with the spring connector 319 being elastically deformed accordingly. Then, the clamping member 318 is released, and the shooting device is clamped against the upper surface of the inclined boss 3154 of the fixing platform 315, and abuts against the device holding plate. Meanwhile, as the upper surface of the inclined boss 3154 is not parallel to the upper surface of the base portion, it is more advantageous for the shooting device to abut against the fixing platform and the device holding plate.

Further, as shown in FIG. 12, the outer surface of the support plate 111 is further provided with a groove 321. The groove 321 is shaped corresponding to the hook 3181 of the clamping member 318, so that the hook 3181 can engage with the groove 321. In this case, when it is needed to be folded, the device holding plate 316 is rotated about a shaft between a fixing member and a connecting member, to be folded on the supporting plate 111, and the device holding plate 316 can be locked on the supporting plate 111 by a snap-fit of the hook 3181 and the groove 321. Therefore, in a storage state, the device holding plate 316 is folded to be parallel to the supporting plate 111, and the hook of the clamping member 318 is locked into the groove 321. In use, that is, when the shooting device is held on the fixing platform 315, the device holding plate 316 may be folded to a preset angle (e.g., about 90 degrees) from the supporting plate 111, and the shooting device abuts against the device holding plate 316 and is clamped between the clamping member 318 and the fixing platform 315.

Further, as shown in FIG. 12, the supporting plate 111 is provided with the knob 322. The knob 322 includes a cap and a rod that is fixedly mounted within the cap. The cap is formed as a substantially stepped cylindrical member having two concentric cylinders, one of which is provided with uniform teeth in an axial direction on an outer surface for rotating the knob, and the cap is provided with a central hole. The rod includes a connecting portion and a threaded portion. The connecting portion is configured to be fixedly mounted into the central cavity of the cap, and the threaded portion is configured to be threadly connected with an internal thread of the groove member 311 and that of the central cylindrical cavity of the projection 3152. In use, the rod is rotated by screwing the cap, and via the above-mentioned threaded connection, the fixing platform is moved along the rails 312 of the supporting plate 111 by the rod, so as to change the position of the shooting device relative to the supporting plate 111 and adjust the balance of the base 100.

In the embodiment shown in FIG. 12, in use, after the shooting device is held on the position adjusting mechanism 300, the device holding plate 316 may be rotated about a rotation axis towards or away from the supporting plate 111, to change a view angle of the shooting device, and the shooting device is secured to the supporting plate 315 by the device holding plate 316 in cooperation with the fixing platform 315.

Further, in order to maintain the balance of the base, a center of gravity of the base 100 can be changed by rotating the knob 322 to control the position of the fixing platform 315 on the supporting plate 111 in the forward and backward direction.

The position adjusting mechanism of the handheld stand of the present disclosure has the following advantages:

In use, the shooting device can be tightly held. In the storage state, the device holding plate can be locked on the supporting plate by the snap-fit of the hook and the groove, and thus cannot be deployed due to an unexpected external force.

The position of the shooting device in the forward and backward direction can be adjusted by adjusting the knob, the center of gravity of the handheld stand can be adjusted to achieve a three-axis balance of the handheld stand with a smaller motor torque.

Connecting Mechanism 400

As shown in FIG. 1, a connecting mechanism 400 is further provided at a tail portion of the base 100. The connecting mechanism 400 is configured to connect the counterweight 500 and the base 100. In a preferred example, the connecting mechanism 400 is formed in a shape of an arc and the counterweight 500 is located directly below the rotatable handle mechanism 200.

Figure 15:
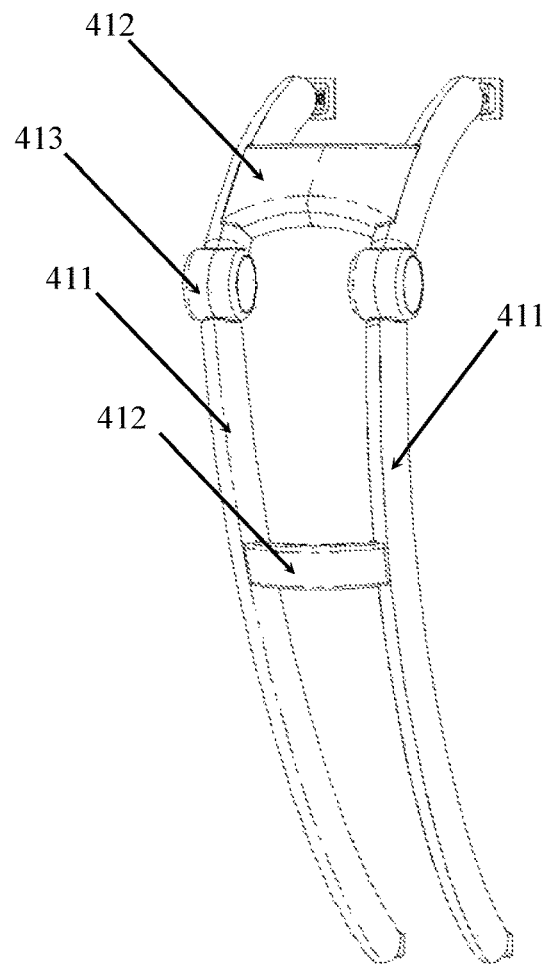
FIG. 15 is a schematic structural view of the connecting mechanism 400 shown in FIG. 1.

FIG. 15 is a schematic structural view of the connecting mechanism 400 shown in FIG. 1. As shown in FIG. 15, the connecting mechanism 400 includes two connecting rods 411 and a stabilizing piece 412 for connecting the two connecting rods 411. Each connecting rod 411 is provided with an assembly at upper and lower ends for connecting with the base 100 and the weight 500 respectively. The connecting rods 411 are arranged side by side and connected by a stabilizing piece 412. The stabilizing piece 412 is disposed between the two connecting rods 411, for increasing a rigidity of the connecting mechanism so as not to be easily broken.

Further, the connecting mechanism 400 further includes a pivoting mechanism 413, for achieving a rotation of the connecting rod 411 relative to the stabilizing piece 412, so as to fold or deploy the connecting mechanism 400. There are various implementations for the pivoting mechanism 413, a preferred embodiment of which is shown in FIG. 16.

Figure 16:
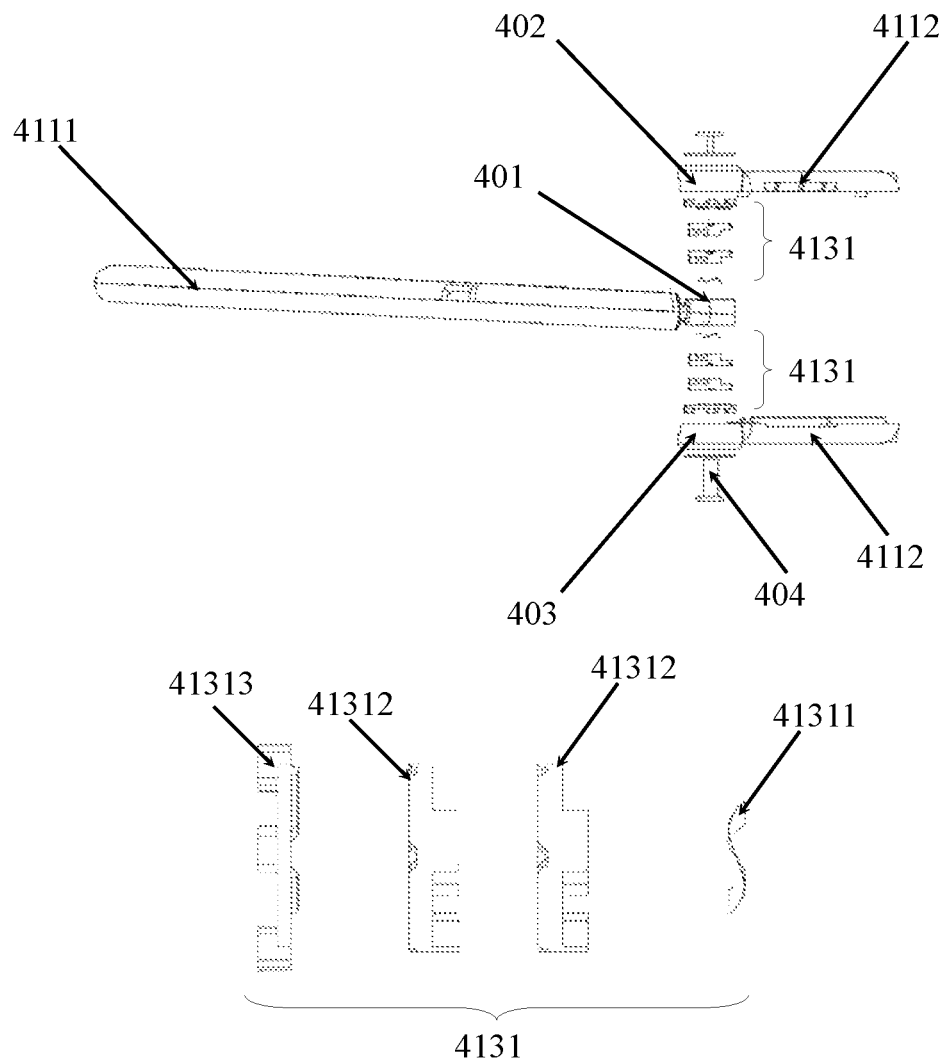
FIG. 16 is an exploded view of a pivoting mechanism 413 according to an embodiment of the present disclosure.

FIG. 16 is an exploded view of the pivoting mechanism 413 according to an embodiment of the present disclosure. As shown in FIG. 16, the pivoting mechanism 413 divides the connecting rod 411 into a first connecting rod 4111 and a second connecting rod 4112, which can rotate relative to each other through the pivoting mechanism 413.

As shown in FIG. 16, the connecting rod 411 includes the first connecting rod 4111 and the second connecting rod 4112. One end of the first connecting rod 4111 is provided with a middle connecting sheet 401. One end of the second connecting rod 4112 is provided with a first and second connecting sheets 402, 403. The first connecting sheet 402, the middle connecting sheet 401 and the second connecting sheet 403 may be connected together in order by a rotation shaft 404. There are many ways of connecting the sheets by a shaft. For example, the sheets can be screwed or riveted, or by other manners. The pivoting mechanism 413 includes locking assemblies 4131, and as shown in FIG. 16, the locking assemblies 4131 are respectively disposed between the first connecting sheet 402 and the middle connecting sheet 401 and between the middle connecting sheet 401 and the second connecting sheet 403.

Specifically, the locking assembly 4131 includes two ring pieces and one elastic piece. The elastic piece forces two opposing faces respectively from the two ring pieces to closely engage with each other by its elasticity. For the two opposing faces of the two ring pieces, one face includes a plurality of protrusions and the other face includes a plurality of depressions. The shapes of protrusions and depressions can match with each other. For two faces respectively from the two ring pieces that do not engage with each other, one face is fixedly connected to the middle connecting sheet, and the other face is fixedly connected to the first connecting sheet 402 or the second connecting sheet 403. Each component of the locking assembly 4131 is provided with a center hole and can be fastened together in an order of the first, middle and second connecting sheets through a rotation shaft or a screw.

In a preferred embodiment, the ring piece 41312 has four depressions and is made by a wear-resistant reinforcement. The depressions are formed as sector-shaped depressions. The ring piece 41313 has three protrusions and is made by a wear-resistant reinforcement. To engaging with the depressions, the protrusions are formed as sector-shaped protrusions.

The elastic piece 41311 may be a wave washer or an elastic rubber ring. In a preferred embodiment, the elastic piece is a wave washer and is directly mounted on both sides of the middle connecting sheet 401. In another embodiment, the wave washer may be further mounted between the first connecting sheet 402 and the ring piece 41312 and between the second connecting sheet 403 and the ring piece 41313.

In a preferred embodiment, the second connecting rod 4112 is formed by two halves engaging with each other, wherein one half is provided at one end with the first connecting sheet 402 and the other half is provided at one end with the second connecting sheet 403. Further, the rotation shaft 404 consists of a screw and a nut, and the ring pieces 41312 and 41313 are tightly engaged with each other by fastening of the screw and the nut and the elastic force of the wave washer 41311.

Further, two decorative sheets are provided at both ends of the rotation shaft 404 for decorating the assembly of the pivoting mechanism. In the present embodiment, the first connecting sheet 402 and the second connecting sheet 403 form a cavity with the engagement of the two halves of the second connecting rod 4112, in which the locking assembly 4131 and the middle connecting sheet 401 can be accommodated.

In a preferred example, the inserted assembly 4131 is composed of one ring piece 41313, one ring piece 41312 and one elastic piece 41311.

The above-mentioned foldable component can reach a stable sate when the two connecting rods are rotated relative to each other with a certain angle, and cannot be rotated only when an external force is large enough, and can have multiple stable states where the two connecting rods are rotated relative to each other with other angles.

After assembling the pivoting mechanism 413 according to the assembly relationship in the embodiment as shown in FIG. 16, the protrusions engages with depressions to define a rotation stop position of the second connecting rod 4111 so that the second connecting rod 4111 can rotate around a pivot towards the base 100. The numbers of the protrusions and the depressions can be determined according to an overall size of the handheld stand such that the second connecting rod 4111 can be folded to a position where the second connecting rod 4111 abuts against the base and reaches a stable state that it cannot be easily rotated by a small external force.

Storage State

Figure 17:
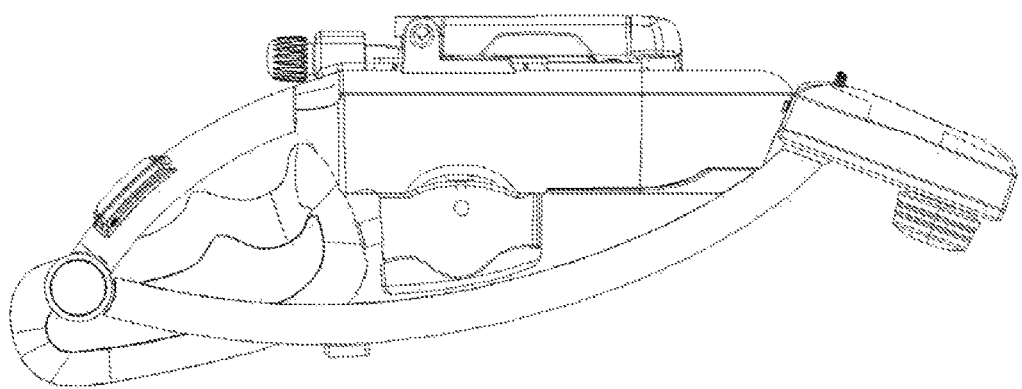
FIG. 17 is a schematic diagram of a hand-held stand in a storage state according to an embodiment of the present disclosure.

When the handheld stand is not used, it can be folded into a structure shown in FIG. 17. FIG. 17 is a schematic diagram of the handheld stand in a storage state according to a preferred embodiment of the present disclosure. In the storage state, the second connecting rod 4111 can be folded around the pivoting mechanism to a front end of the base 100, the handle 201 can be rotated to lie on a rear end of the base 100 and received within a space defined by the two folded connecting rods 411, and device holding plate 316 can be turned over to the base 100 through a rotating shaft and engaged with the base 100.

Specifically, the device holding plate 316 is rotated towards the supporting plate 111 about the rotating shaft, and the hook is locked into the groove 321 on the supporting plate 111. Therefore, when the handheld stand is not used, it can be stored by the rod being folded, reducing its occupied space for easy to carry.

The connecting rod is foldable and can form a space below the base after being folded, and the space can be used to receive the handle which is folded to the bottom of the base, so that the components below the base can be accommodated within a small space.

The device holding plate can be rotated to the upper surface of the base, being substantially parallel to the upper surface in the storage state. Moreover, the device holding plate is locked to the base through an elastic component so that the components above the base can be accommodated within a small space. Since it is locked, the device holding plate in the storage state is stable and is less likely to be unintentionally deployed due to an external force.

The connecting rod is divided into two parts which are connected with a pivoting mechanism. The pivoting mechanism has a locking function at a certain angle by which the connecting rod is folded, so that the connecting rod and the handle in the storage state are stable, and are not easily unintentionally deployed due to an external force.

Counterweight 500

As shown in FIG. 1, the counterweight 500 is disposed below the rotatable handle mechanism 200 and is connected to the base 100 through the connecting rod mechanism 400. After the shooting device is held on the base 100, the center of gravity of an overall structure of the handheld stand can be adjusted by adjusting a center of gravity of the counterweight 500, to ensure a balance of the handheld stand in use and obtain a better shooting experience.

Figure 18:
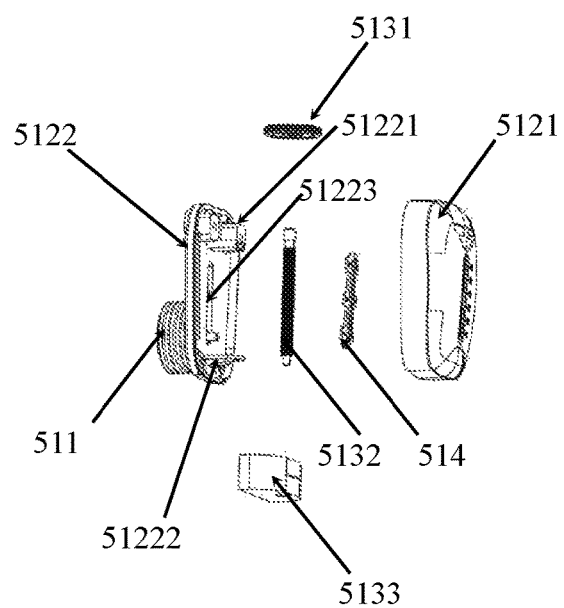
FIG. 18 is an exploded view of a counterweight 500 according to an embodiment of the present disclosure.
Figure 19:
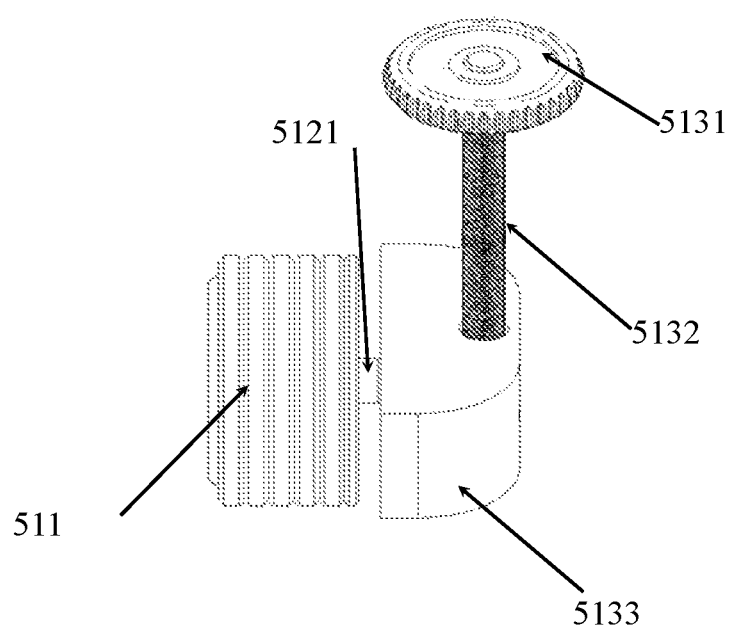
FIG. 19 is a schematic diagram of an assembly relationship between a weight adjustment mechanism and a weight within the counterweight according to an embodiment of the present disclosure.

FIG. 18 is an exploded view of the counterweight 500 according to an embodiment of the present disclosure. FIG. 19 is a schematic diagram showing an assembly relationship between a weight adjusting mechanism and a weight of a counterweight according to an embodiment of the present disclosure. As shown in FIG. 18 and FIG. 19, the counterweight includes a weight 511, a counterweight housing 512, and a weight adjusting mechanism disposed inside the counterweight housing. The weight adjusting mechanism includes an adjusting knob 5131, an adjusting rod 5132 and an adjusting block 5133. The adjusting knob 5131 may be an adjusting gear, part of which extends beyond a surface of the counterweight housing through an opening. The adjusting rod 5132 is connected to a center of the adjusting knob and extends downwardly. The adjusting rod may be a partially threaded bolt (i.e., including a threaded portion and a non-threaded portion), and the non-threaded portion is fixedly connected into the center of the adjusting knob, and the threaded portion defines a displacement distance for the adjusting block. The weight includes multiple stacked disc-shaped magnetic blocks, and a weight of the weight can be changed by increasing or decreasing the number of the magnetic blocks. Moreover, the weight 511 may be provided with a shaft (preferably, a stepped convex shaft provided at a center of the disc of the weight 511), which can engage with an axial hole in the adjusting block 5133, so that the weight 511 is fixed with the adjusting block 5133.

Further, the counterweight housing 512 includes a carrying portion 5122 and a covering portion 5121. The carrying portion has a recess with a small depth. The carrying portion is formed in a substantially rectangular shape with a long axis of symmetry and a short axis of symmetry. A rail 51223 is provided at a position corresponding to the long axis of symmetry of the carrying portion and penetrates through a thickness of the carrying portion in part of the length, and the rail 51223 is configured as a passage for connecting the weight and the adjusting block and a pathway along which the weight moves. Further, a fixing structure is disposed in the recess of the carrying portion and is configured to fix the weight adjusting mechanism. The fixing structure includes a first fixing member 51221 and a second fixing member 51222. The first fixing member 51221 is provided at a top end of the rail with a distance from the top end of the rail. The first fixing member 51221 protrudes vertically from an inner surface of the carrying portion. The second fixing member 51222 is provided at a bottom end of the rail 51223 with a distance from the bottom end of the rail 51223. The second fixing member 51222 protrudes vertically from the inner surface of the carrying portion. The first fixing member 51221 has a bayonet. During assembly, the adjusting knob is placed above the first fixing member, and the non-threaded area of the adjusting rod engages with the bayonet. The adjusting block is fixed on the second fixing member after assembled with the adjusting rod. Thus, the weight adjusting mechanism is fixed inside the counterweight housing while the weight is placed outside the counterweight housing.

Further, the covering portion 5121 has a recess with a greater depth, which can be configured to cover the weight adjusting mechanism. In particular, the covering portion can be connected with the carrying portion in a snap-fit way, forming an integrity on the appearance. Further, the carrying portion is provided with screw holes at four corners, and holes are arranged in the internal recess of the covering portion at positions corresponding to the screw holes of the carrying portion. Therefore, during assembly, screws can be used to go through the screw holes and engage with an internal thread of the holes, thereby further fastening the carrying portion and the covering portion.

Further, the counterweight housing is further provided with a mark for displaying a movement position of the adjusting block. The outer surface of the covering portion is provided with a scale bar with the same shape as the rail at a position corresponding to that of the rail, and the scale bar cooperates with the mark to show a raising position of the weight to achieve a balance adjustment of the base.

Further, an upper end of the carrying portion is further provided with connecting recesses or openings symmetrical about the long axis of symmetry, which can engage with connecting projections on the second folded rod to fix the counterweight to the lower end of the connecting mechanism. Thus, the counterweight can cooperate with the motor system to maintain the balance of the base.

The center of gravity of the entire counterweight can be easily and finely adjusted by rotating the adjusting knob.

Because the weight includes multiple stacked disc-shaped magnetic blocks, the number of magnetic blocks can be easily increased or decreased as required, which can easily change a weight of the entire weight to adjust the center of gravity of the handheld stand where the weight is located.

Figure 20:
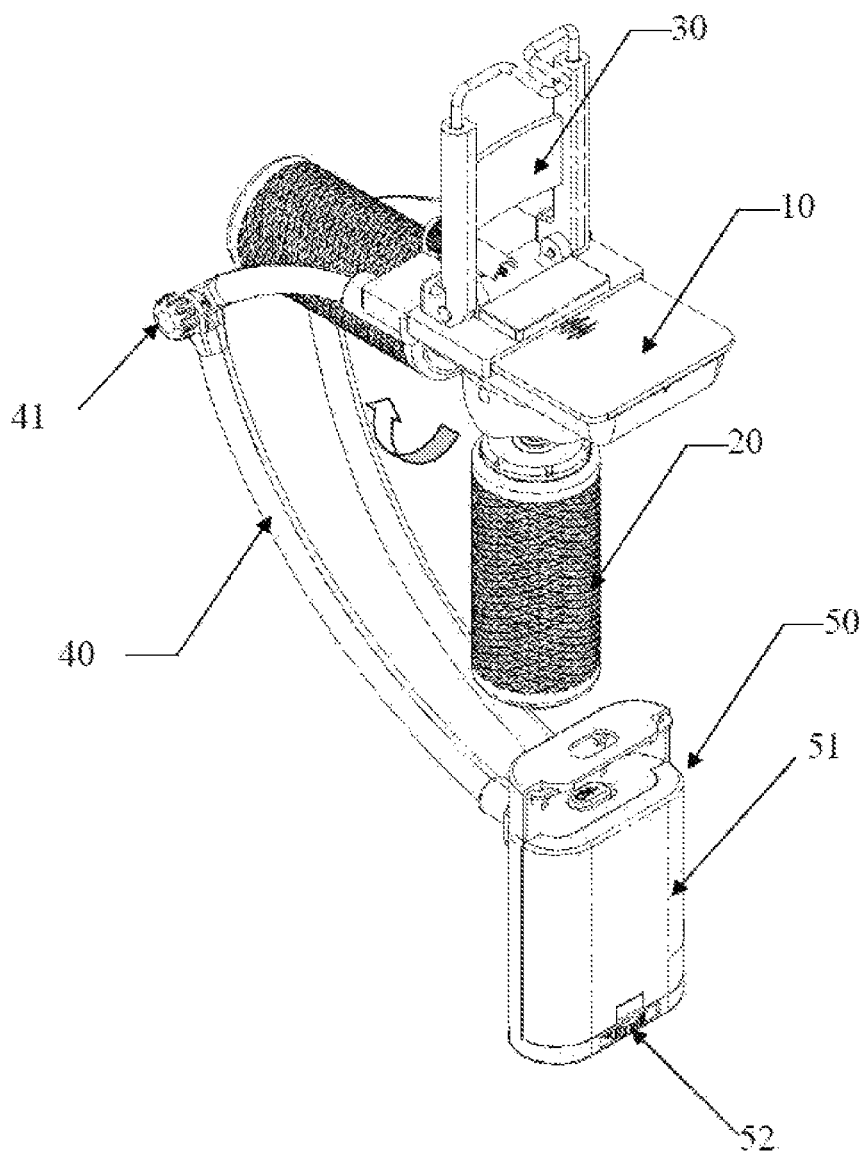
FIG. 20 and FIG. 21 are schematic structural views of a handheld stand for shooting according to another embodiment of the present disclosure.
Figure 21:
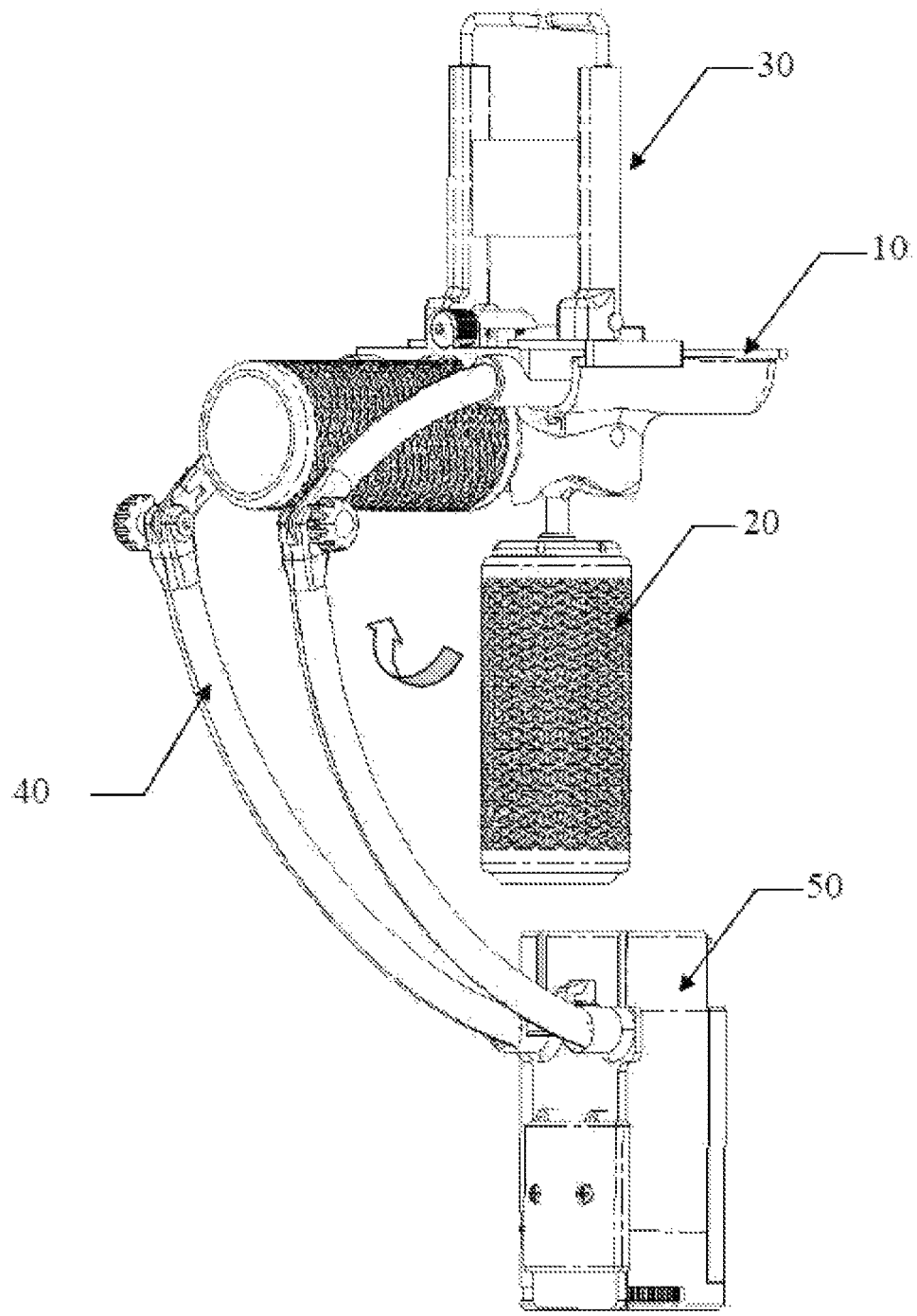

FIG. 20 and FIG. 21 are schematic structural diagrams of a handheld stand for shooting according to another embodiment of the present disclosure. As shown in FIG. 20 and FIG. 21, the difference between the present embodiment and the previous embodiment lies in that in the present embodiment, the power supply system is configured as a battery module 50 having a counterweight function and is connected to the base 10 by a foldable rod 40. The battery module is disposed below the rotatable handle mechanism 20 and provides electric power to a circuit in the base through wires disposed within the foldable rod.

In addition to supplying electric power to the base through wires disposed within the foldable rod, the battery module 50 is further provided with an adjusting knob, and a height of the battery can be changed by rotating the adjusting knob so as to change a center of gravity of the base. Further, the foldable rod 40 has an external knob. By rotating the external knob, a folded angle of the foldable rod can be changed. A final folded angle of the foldable rod can be controlled by adjusting degree of tightness of the folded knob.

The base housing located at an upper portion is not provided with a heavy battery. Compared with the handheld stand of the previous embodiment, the center of gravity of the handheld stand is lowered without increasing a weight of the overall structure, so that the handheld stand is more stable.

Specifically, as shown in FIG. 20 and FIG. 21, the present embodiment discloses a handheld stand, which includes a base 10, a rotatable handle mechanism 20, a position adjusting mechanism 30, a foldable rod 40 and a battery module 50. The rotating handle mechanism 20 is connected to a bottom of the base 10 through a rotating shaft, and the base 10 is rotatable relative to the rotatable handle mechanism 20. The position adjusting mechanism 30 is disposed on an upper surface of the base 10 for holding the shooting device and adjusting a position of the shooting device relative to the base 10. The battery module 50 is disposed below the rotatable handle mechanism 20 and connected with the base 10 through the connecting rod 40. The battery module 50 is configured to supply electrical power to the handheld stand and adjust the center of gravity of the handheld stand.

Further, the handle can be rotated in a direction indicated by an arrow shown in FIG. 20 and FIG. 21, and in one embodiment, the handle may be rotated in any direction.

As shown in FIG. 20 and FIG. 21, the battery module includes a supporting shell 51, an adjusting knob 52, and a battery disposed inside the supporting shell 51. The adjusting knob 52 extends partially out of the supporting shell 51 through an opening and is disposed at a lower part of the supporting shell 51. A vertical height of the battery can be changed by sliding the adjusting knob 52 so as to change the center of gravity of the overall handheld stand.

Figure 22:
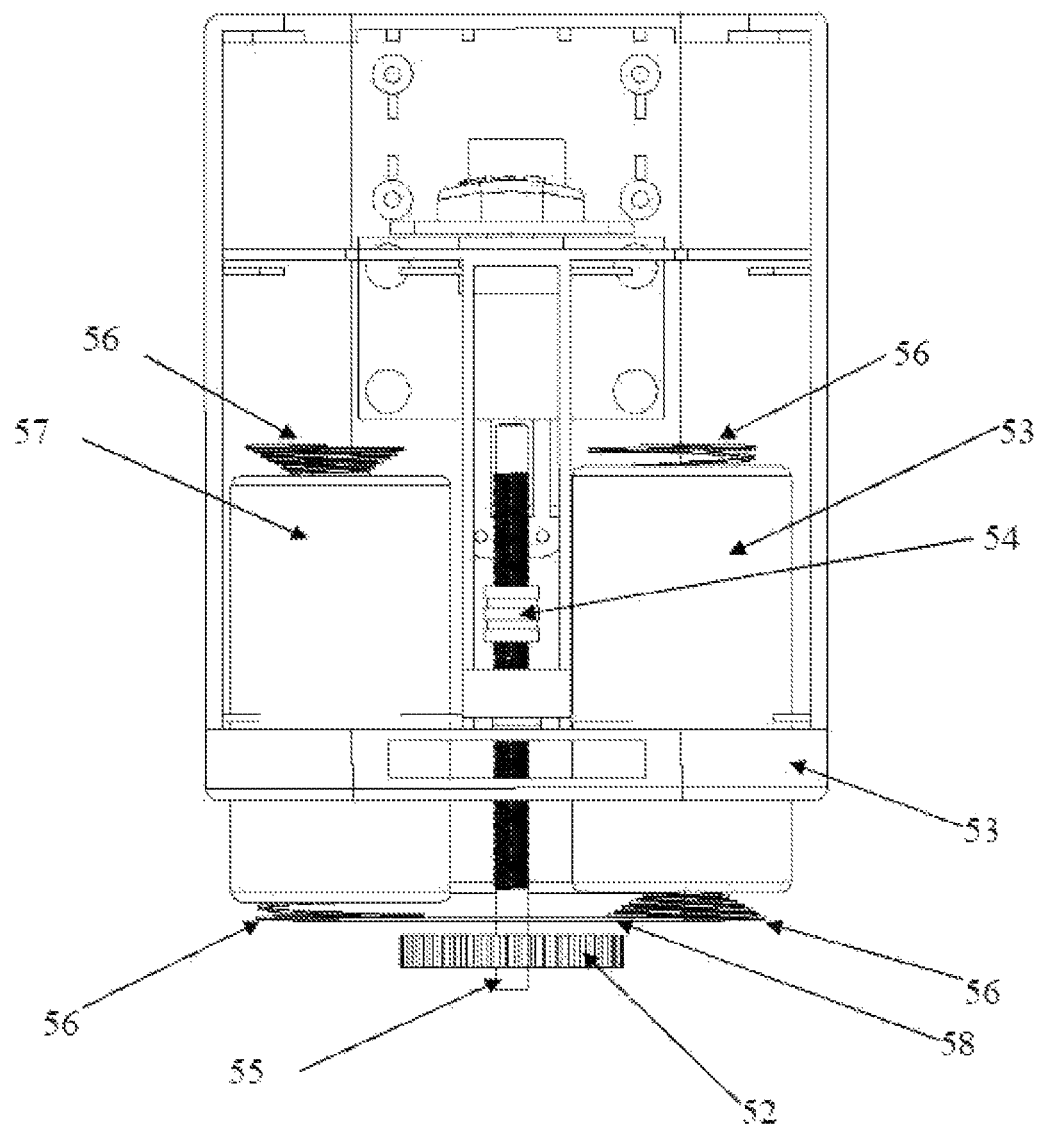
FIG. 22 and FIG. 23 are schematic views of an internal structure of a battery module 50 according to another embodiment of the present disclosure.
Figure 23:
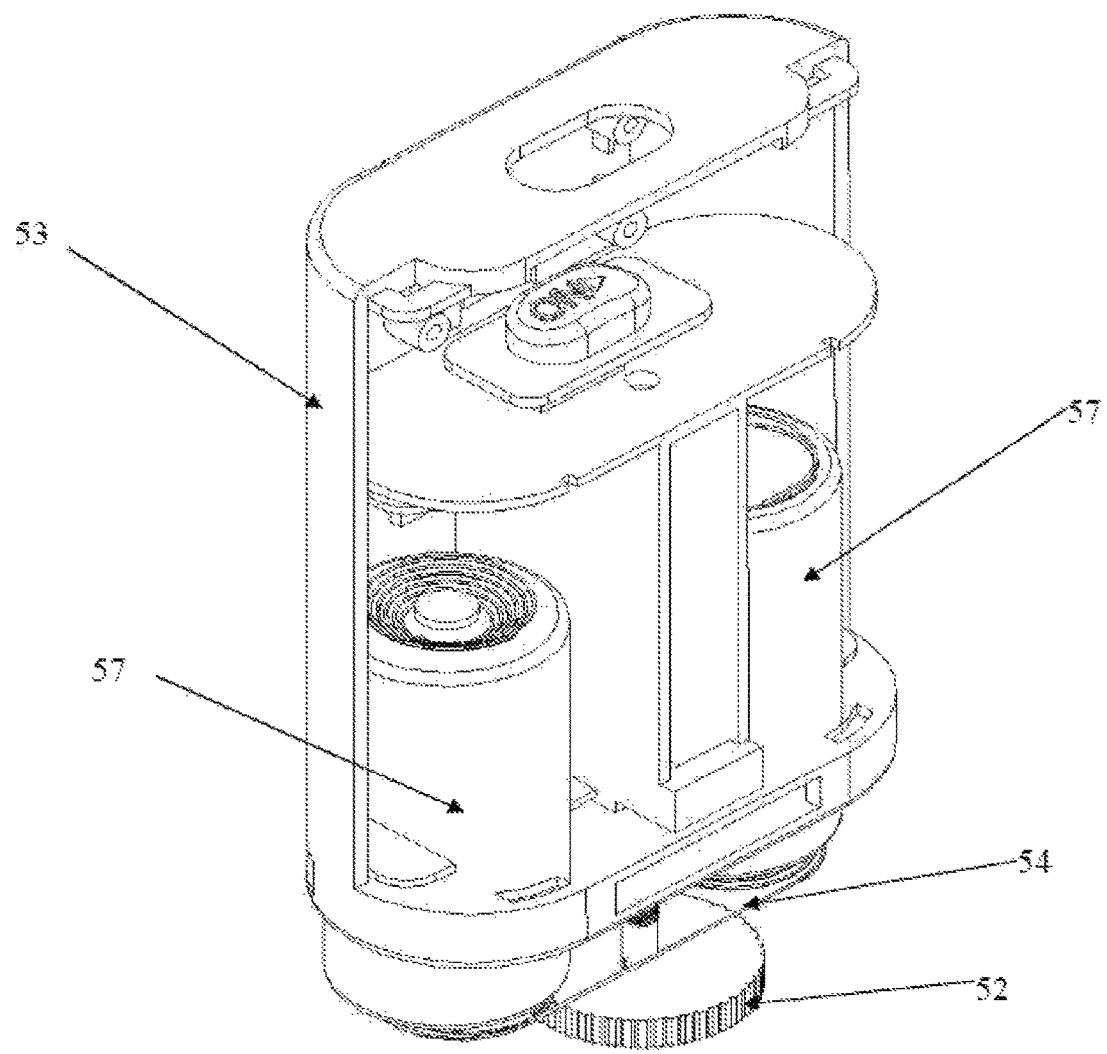

FIG. 22 and FIG. 23 are schematic views of an internal structure of a battery module 50 according to another embodiment of the present disclosure. The internal structure of the battery module 50 further includes a battery supporting bracket 53, an adjusting block 54, an adjusting rod 55, a contact spring 56, and batteries 57. The two batteries 57 are respectively supported on two sides of the battery supporting bracket 53 and abut against a supporting plate 58 by the function of the contact springs 56. The adjusting rod 55 is disposed between the adjacent batteries 57, and provided with a threaded region. The supporting plate 58 and adjusting knob 56 are mounted on the adjusting rod 55, with the supporting plate 58 disposed above the adjusting knob 56. The adjusting block 54 is provided on the battery supporting bracket 53 and is mounted with the adjusting rod 55. In this embodiment, the adjusting block 54 is further disposed between the two batteries 53. These internal components are encased within the supporting shell 51, with the adjusting knob 52 extends partially out of the supporting shell 51 from the opening on a lower portion of the supporting shell 51 for sliding or rotating.

Further, both ends of the adjusting rod are also provided with a non-threaded region for limiting a movement height of the adjusting rod 55.

In use, the shooting device is held on the position adjusting mechanism. The adjusting knob 52 is rotated to change the height of the whole assembly consisting of the battery supporting bracket 53, the adjusting plate 58 and the adjusting block 54 together with the battery 57, so as to change the position of the center of gravity of the battery module and thereby change the center of gravity of the entire handheld stand.

Further, it is also possible to further adjust the center of gravity of the entire handheld stand by changing the front-back position of the shooting device relative to the base 100 by the position adjusting mechanism.

Further, a balance of the handheld stand in the horizontal, rolling and pitching directions can be adjusted by the horizontal motor, the rolling motor and the pitching motor so as to further ensure the balance of the handheld stand.

Further, the connecting rod can be continuously folded to an arbitrary angle by the external knob to balance and fold the entire handheld stand as required.

Figure 24:
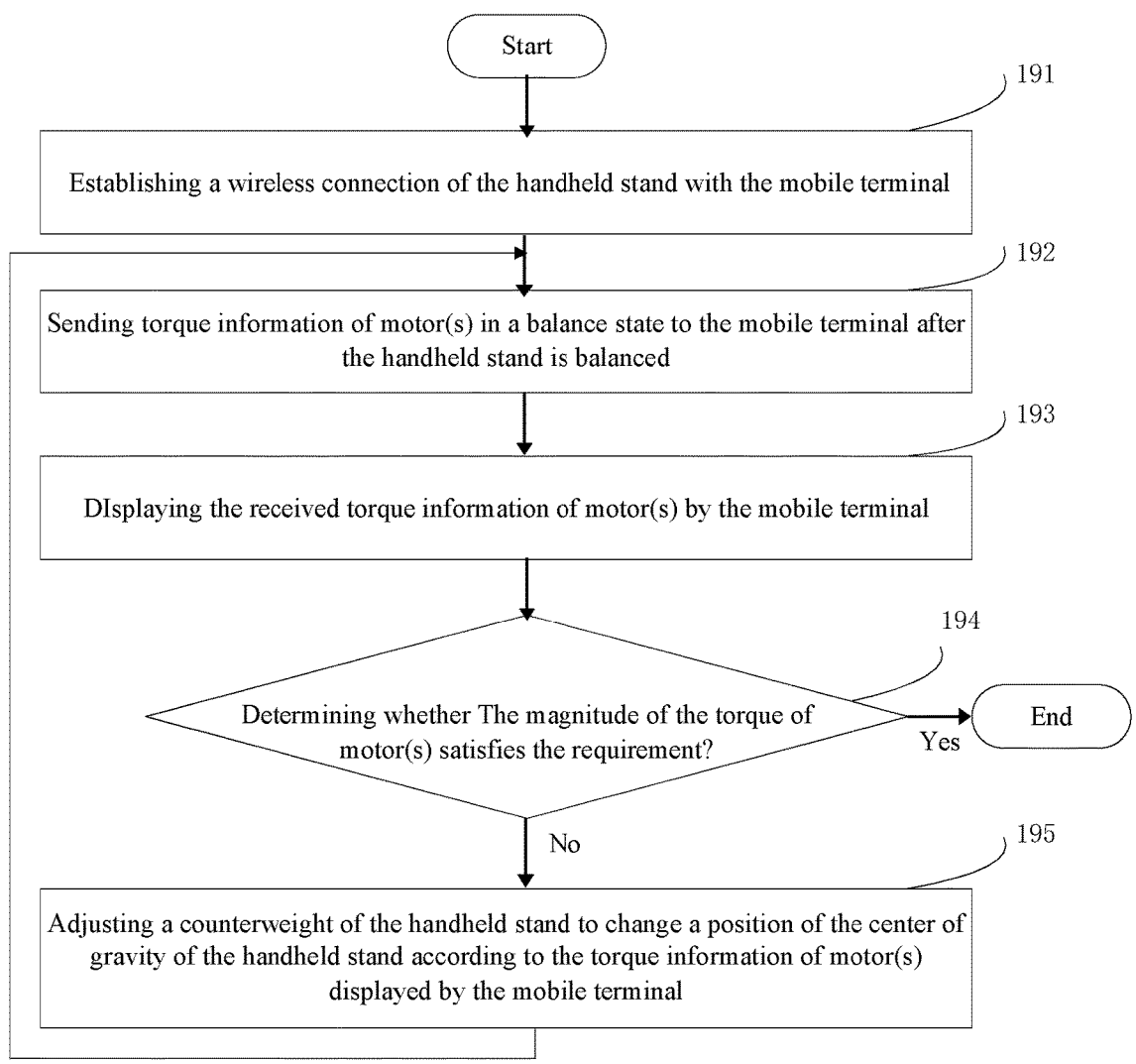
FIG. 24 is a schematic flow chart of a method for adjusting a center of gravity of a handheld stand according to an embodiment of the present disclosure.

The present disclosure further relates to a method for adjusting a center of gravity of a handheld stand. FIG. 24 is a schematic flowchart of a method for adjusting the center of gravity of the handheld stand. The method for adjusting the center of gravity of the handheld stand comprises the following steps.

In step 191, a wireless connection of the handheld stand with a mobile terminal is established. The mobile terminal may be a smart phone, a tablet, a laptop, or the like. The handheld stand includes: an inertial measurement unit for measuring and outputting three-axis attitude angles and an acceleration of the handheld stand; and a control circuit for controlling torques of three motors according to an output of the inertial measurement unit so as to achieve a balance of the handheld stand.

In a preferred example, the handheld stand and the mobile terminal may be connected in a Bluetooth manner. In another embodiment, the handheld stand and the mobile terminal can be connected by WIFI. In another embodiment, both the handheld stand and the mobile terminal are connected to a mobile communication network (such as a 4G network), and the stand and the mobile terminal are connected through a mobile Internet. In another embodiment, the handheld stand and the mobile terminal may also be connected in a wired manner.

Then the method proceeds to step 192. After a balance of the handheld stand is achieved, torque information of motor (s) in the balance state is sent to the mobile terminal. In the embodiments of the present disclosure, the balance of the handheld stand includes a horizontal plane of a platform (for example, the base 100 and the base 10 in the previous embodiments of the handheld stand) for holding the shooting device. That is to say, in the balance state, the platform should be horizontal. Horizontal bubble meter can visually and intuitively show a magnitude and a direction of the motor torque. Specifically, the handheld stand includes three motors for respectively adjusting the stability of the handheld stand about three orthogonal axes. The torque information of motor(s) includes torque information of two motors in the three motors, which are configured to adjust the balance of the platform about the two orthogonal axes in the horizontal plane.

Then the method proceeds to step 193, wherein the mobile terminal displays received torque information of motor(s). The mobile terminal displays magnitude and direction of the torque by use of the horizontal bubble meter based on the torque information of the two motors which are configured to adjust the balance of the platform about the two orthogonal axes in the horizontal plane.

Then the method proceeds to step 194. It is determined whether the magnitude of the motor torque displayed by the mobile terminal meet the requirement. In general, if the bubble in either one of the two orthogonal directions is located in the middle (i.e., the absolute value of the motor torque in each direction is less than a predetermined threshold), the requirement is met. If the requirement is met, the adjustment of the center of gravity is completed. Otherwise, the method proceeds to step 195.

In step 195, the counterweight of the handheld stand is adjusted according the torque information of motor(s) displayed by the mobile terminal to change a position of the center of gravity of the handheld stand. Then go back to step 192. The direction and magnitude of the adjustment of the counterweight can be determined based on the position of the bubble on the horizontal bubble meter.

Generally, the above steps are repeated at least once, and each repetition is performed to make the absolute value(s) of the torque of motor(s) displayed on the mobile terminal become smaller.

The handheld stand sends the torque of motor in a balance state to the mobile terminal for display. According to the displayed information, the counterweight of the handheld stand can be adjusted, so as to quickly adjust the handheld stand to a balance state with a minimum torque of motor, avoiding a high temperature and high energy consumption of the motor caused by the motor outputting a large torque over a long time.

The method according to above-mentioned embodiments of the present application can be used with various implementations of the handheld stand, as long as the handheld stand can adjust its center of gravity and can send attitude information to the mobile terminal. Preferably, the handheld stand can be implemented as any one of the previous embodiments. In the previous embodiment, the above step 195 may be used to adjust the center of gravity of the handheld stand in the following ways:

by adjusting the knob 322 (referred to FIG. 12), adjusting the position of the device holding mechanism (including 318, 316, 315, etc.) for holding the mobile phone in the horizontal direction to change the position of the center of gravity of the handheld stand;

by rotating the adjusting knob (5131) to change the height of the adjusting block (5133) and the weight (511) so as to change the center of gravity of the counterweight (500) (referring to FIG. 2, FIG. 18 and FIG. 19); and changing the center of gravity of the counterweight by increasing or decreasing the number of disc-shaped magnet blocks of the weight (511) (referring to FIG. 2, FIG. 18 and FIG. 19).

The present disclosure provides a handheld device for shooting, which can be implemented by the following embodiments.

1. A handheld device for shooting, comprising a rotatable handle mechanism, a base, a position adjusting mechanism, a connecting mechanism and a counterweight, wherein:

the rotatable handle mechanism is connected to a bottom of the base, so that the base is rotatable with respect to the rotatable handle mechanism;

the position adjusting mechanism is disposed on an upper surface of the base, for fixing a shooting device and adjusting a position of the shooting device relative to the base;

the counterweight is disposed below the rotatable handle mechanism and connected to the base via the connecting mechanism, and the counterweight is configured to adjust a center of gravity of the base.

2. The handheld device for shooting according to item 1, wherein the rotatable handle mechanism includes a handle housing and a rotatable shaft partially inserted into the handle housing, wherein the rotatable handle mechanism is configured to support the base via the rotatable shaft.

3. The handheld device for shooting according to item 1, wherein the connecting mechanism is formed as an arc-shaped connecting rod, one end of which is fixed on one side of the base in a horizontal direction.

4. The handheld device for shooting according to item 1, wherein the base, the rotatable handle mechanism and the counterweight are coplanar in a vertical direction.

5. The handheld device for shooting according to any one of items 1 to 4, wherein the rotatable handle mechanism includes a handle housing and a horizontal motor disposed inside the handle housing, wherein a rotatable shaft is fixed at a top of the horizontal motor, and a rolling motor is fixed at a top of the rotatable shaft, a pitching motor and a rotating mechanism are provided within the base, wherein the rotating mechanism comprises a first transmission gear ring and a second transmission gear ring whose axes are perpendicular to each other, the rolling motor is connected with the first transmission gear ring by a gear engagement;

the pitching motor is connected with the second transmission gear ring by a gear engagement; and the top of the rotatable shaft is rotatably connected with the rotating mechanism.

6. The handheld device for shooting according to item 5, wherein the first and second transmission gear rings are rings in a sector shape.

7. The handheld device for shooting according to item 6, wherein a sector-shaped central angle of the first transmission gear ring is between 120 and 150 degrees and a sector-shaped central angle of the second transmission gear ring is between 30 and 60 degrees.

8. The handheld device for shooting according to item 7, wherein a transmission pinion is mounted on a shaft of each of the rolling motor and the pitching motor;

the rolling motor engages with the first transmission gear ring through the transmission pinion; and the pitching motor engages with the second transmission gear ring through the transmission pinion.

9. The handheld device for shooting according to item 7, further comprising:

an inertial measurement unit for measuring a three-axis attitude angle and an acceleration; and a control circuit electrically connected with the inertial measurement unit, for generating a three-way control electric signals according to the three-axis attitude angle and the acceleration output from the inertial measurement unit and outputting the three-way control electric signals respectively to the horizontal motor, the rolling motor, and the pitching motor.

10. The handheld device for shooting according to item 9, wherein the inertial measurement unit comprises a gyroscope and an accelerometer.

Compared with the prior art, the above-described handheld device of the present disclosure has at least the following differences and effects: the counterweight is disposed below the rotatable handle mechanism and connected to the base through the connecting mechanism, so that the center of gravity of the entire handheld stand is lowered and the handheld stand is more stable.

By the counterweight and the position adjusting mechanism with an adjustable position, the center of gravity of the handheld stand can be further finely adjusted to reduce a torque and power consumption of an automatic balancing motor servo system in a balanced state.

The present disclosure further provides a foldable handheld device for shooting, which can be implemented by the following embodiments.

1. A foldable handheld device for shooting, comprising a rotatable handle mechanism, a base, a connecting mechanism, and a counterweight, wherein
the rotatable handle mechanism is connected to a bottom of the base, being rotatable in any direction relative to the base, and the counterweight is disposed below the rotatable handle mechanism and is connected to the base by the connecting mechanism which is foldable, and
in a storage state, the rotatable handle mechanism is rotated to abut against a bottom of the base, and the connecting mechanism is folded to the bottom of the base.

2. The foldable handheld device for shooting according to item 1, wherein,
the connecting mechanism comprises two connecting rods arranged side by side, each of the connecting rods comprises a first connecting rod and a second connecting rod connected by a pivoting mechanism,
in a storage state, the second connecting rod is folded about the pivoting mechanism to one end of the base, and the rotatable handle is rotated to abut against the other end of the base and received within a space defined by the two folded connecting rods.

3. The foldable handheld device for shooting according to item 2, further comprising a device holding plate connected to the base to hold a shooting device; and in the storage state, the device holding plate is turned over to an upper surface of the base.

4. The foldable handheld device for shooting according to item 2, wherein the first connecting rod is a hollow rod, has a protrusion at one end, and is connected with the base through the protrusion, and the connecting rod is provided with a cylindrical housing at the other end to define a cylindrical cavity for accommodating the pivoting mechanism, and one end of the second connecting rod is provided with a recess for engaging with the pivoting mechanism and the other end is provided with a projection for connecting with the counterweight.

5. The foldable handheld device for shooting according to item 4, wherein the other end of the first connecting rod is provided with a middle connecting sheet, the one end of the second connecting rod is provided with a first and second connecting sheets, the first connecting sheet, the middle connecting sheet and the second connecting sheet are connected together in order by a rotating shaft; and a locking assembly is respectively disposed between the first connecting sheet and the middle connecting sheet and between the middle connecting sheet and the second connecting sheet.

6. The foldable handheld device for shooting according to item 5, wherein the locking assembly comprises two ring pieces and an elastic piece, wherein the elastic piece is configured to force two opposing faces respectively from the two ring pieces closely engage with each other by its elasticity; one of the two opposing faces of the two ring pieces includes a plurality of protrusions and the other face includes a plurality of depressions shaped the protrusions; and for two faces of the two ring pieces that do not engage with each other, one face is fixedly connected to the middle connecting sheet and the other face is fixedly connected to the first connecting sheet or the second connecting sheet.

7. The foldable handheld device for shooting according to item 6, wherein the elastic piece is a wave washer.

8. The foldable handheld device for shooting according to item 6, wherein the elastic piece is an elastic rubber ring.

9. The foldable handheld device for shooting according to item 6, wherein the ring piece is formed as a wear-resistant reinforcement.

10. The foldable handheld device for shooting according to item 2, wherein the device holding plate can be folded to become parallel with the base and engage and lock with the base.

Compared with the prior art, the above-described handheld device of the present disclosure has at least the following differences and effects: the connecting rod is foldable, and a space is formed below the bottom of the base after the connecting rod is folded, to accommodate the handle which is folded to the bottom of the base, so that the components below the base can be accommodated within a very small space.

In the storage state, the device holding plate can be turned over to the upper surface of the base and is substantially parallel to the surface, and can be locked to the base through the elastic piece so that the components above the base can be accommodated within a small space. Since the device holding plate is locked and thus it is stable in the storage state and is less likely to be unintentionally deployed due to an external force.

The connecting rod is divided into two parts which are connected with a pivoting mechanism. The pivoting mechanism has a locking function at different folded angles, so that the connecting rod and the handle in the folded state are stable, and are not easily unintentionally deployed due to an external force.

The present disclosure further provides a counterweight with an adjustable center of gravity and a handheld stand, which can be implemented by the following embodiments.

1. A counterweight with an adjustable center of gravity, comprising a weight, a counterweight housing and a weight adjusting mechanism arranged inside the counterweight housing, wherein
the weight adjusting mechanism comprises an adjusting rod, and an adjusting knob and an adjusting block arranged at two ends of the adjusting rod, the weight is fixed on the adjusting block and is arranged outside the counterweight housing, the adjusting knob extends partially out of the counterweight housing via an opening, and the center of gravity of the counterweight can be changed by rotating the adjusting knob to change a height of the adjusting block and the weight.

2. The counterweight with an adjustable center of gravity according to item 1, wherein the weight includes a plurality of stacked disk-shaped magnetic blocks.

3. The counterweight with an adjustable center of gravity according to item 2, wherein the weight is provided with a stepped convex shaft and a center of the adjusting block is provided with an axial hole which is connected with the weight by the convex shaft.

4. The counterweight with an adjustable center of gravity according to item 1, wherein a mark is further arranged inside the counterweight housing for indicating a height of the adjusting block and the weight.

5. The counterweight with an adjustable center of gravity according to item 1, wherein the counterweight housing comprises a carrying portion and a covering portion, a rail is disposed in the middle of the carrying portion, the weight is connected with the adjusting block through the rail, and the carrying portion is provided with a fixing structure for fixing a weight adjusting mechanism; and the covering portion is configured to cover the weight adjusting mechanism.

6. A handheld stand comprising the counterweight according to any one of items 1 to 5.

7. The handheld stand according to item 6, comprising: a rotatable handle mechanism, a base, a connecting rod and the counterweight;

the rotatable handle mechanism is connected to a bottom of the base, wherein the base is rotatable with respect to the rotatable handle mechanism; and the counterweight is disposed below the rotatable handle mechanism and connected to the base via the connecting rod.

8. The handheld stand according to item 7, wherein the base is connected to the counterweight by two connecting rods arranged side by side, each of the connecting rods comprises a first connecting rod and a second connecting rod connected by a pivoting mechanism; one end of the first connecting rod is provided with a middle connecting sheet, and one end of the second connecting rod is provided with a first and second connecting sheets, wherein the first connecting sheet, the middle connecting sheet and the second connecting sheet are connected together in order through a rotating shaft; and a locking assembly is respectively disposed between the first connecting sheet and the middle connecting sheet and between the middle connecting sheet and the second connecting sheet.

9. The handheld stand according to item 8, wherein the locking assembly comprises two ring pieces and an elastic piece; the elastic piece is configured to force two opposing faces respectively from the two ring pieces closely engage with each other; one of the two opposing faces of the two ring pieces includes a plurality of protrusions and the other face includes a plurality of depressions shaped corresponding to the protrusions; and for two faces of the two ring pieces that do not engage with each other, one face is fixedly connected to the middle connecting sheet and the other face is fixedly connected to the first connecting sheet or the second connecting sheet.

10. The handheld stand according to item 6, further comprising a position adjusting mechanism disposed on an upper surface of the base for holding the shooting device and adjusting a position of the shooting device relative to the base.

Compared with the prior art, the above-mentioned counterweight with an adjustable center of gravity and the handheld stand has at least the following differences and effects.

The center of gravity of the entire counterweight can be easily and finely adjusted by rotating the adjusting knob.

Because the weight is formed by multiple stacked disc-shaped magnetic blocks, the number of magnetic blocks can be easily increased or decreased as required, which can easily change a weight of the entire weight to adjust the center of gravity of the handheld stand where the weight is located.

The present disclosure also provides a handheld stand, which can be implemented by the following implementations.

1. A handheld stand, comprising a rotatable handle mechanism, a base, a position adjusting mechanism, a connecting rod and a battery module; wherein, the rotatable handle mechanism is connected to a bottom of the base, and the base is rotatable relative to the rotatable handle mechanism;

the position adjusting mechanism is disposed on an upper surface of the base for holding a shooting device and adjusting a position of the shooting device relative to the base; and the battery module is disposed below the rotatable handle mechanism and connected to the base via the connecting rod, and the battery module is configured to supply power to the handheld stand and adjust a center of gravity of the handheld stand.

2. The handheld stand according to item 1, wherein the battery module comprises a supporting housing, an adjusting knob, and a battery disposed within the supporting housing; wherein, the adjusting knob extends partially out of the supporting housing via an opening, and the adjusting knob is rotated to change a height of the adjusting plate and the battery so as to change a center of gravity of the battery module.

3. The handheld stand according to item 1, wherein the position adjusting mechanism comprises a supporting plate, an adjusting knob and a device holding mechanism, wherein the supporting plate is provided with a guide rail, the device holding mechanism is mounted on the guide rail and is arranged on the supporting plate, the adjusting knob is connected to the device holding mechanism and is capable of adjusting a movement of the device holding mechanism along the guide rail in the upper surface of the base, and the shooting device is held on the device holding mechanism.

4. The handheld stand according to item 1, wherein the device holding mechanism is connected to the adjusting knob by a screw.

5. The handheld stand according to item 1, wherein the position adjusting mechanism further comprises a groove member having a cuboid cavity, disposed on one end of the supporting plate and configured to assemble with the adjusting knob; and the screw passes through the groove member.

6. The handheld stand according to item 2, wherein the battery module further comprises a battery supporting bracket, an adjusting plate, an adjusting rod, a contact spring and a supporting plate arranged inside the supporting housing; wherein the battery is arranged on both sides of the battery supporting bracket and is abutted against the supporting plate by the contact spring;

the adjusting rod is arranged between the adjacent batteries, and is provided with a threaded region and a non-threaded region; and the supporting plate and the adjusting knob are mounted on the adjusting rod, the supporting plate is arranged above the adjusting knob, and the adjusting block is arranged on the battery supporting bracket and is mount on the adjusting rod.

7. The handheld stand according to item 1, wherein the connecting rod is in a shape of arc and provided with an external knob.

8. The handheld stand according to item 1, wherein the rotatable handle mechanism comprises a handle housing and a rotating shaft partially inserted into the handle housing, and the rotatable handle mechanism supports the base by the rotating shaft.

9. The handheld stand according to item 1, wherein the rotatable handle mechanism comprises a handle housing and a horizontal motor arranged inside the handle housing, a top of the horizontal motor is fixed with a rotating shaft, and a top of the rotating shaft is fixed with a rolling motor, a pitching motor and a rotating mechanism are provided within the base, and the rotating mechanism comprises a first transmission gear ring and a second transmission gear ring whose axes are perpendicular to each other;

the rolling motor is connected with the first transmission gear ring through a gear engagement;

the pitching motor is connected with the second drive ring through the gear engagement; and the top of the rotating shaft is rotatably connected with the rotating mechanism.

10. The handheld stand according to item 9, wherein a sector-shaped central angle of the first transmission gear ring is between 120 and 150 degrees and a sector-shaped central angle of the second transmission gear ring is between 30 and 60 degrees.

The above-mentioned handheld stand of the present disclosure brings notable effects.

The battery module is provided below the handle to significantly lower the center of gravity of the entire handheld stand without adding any additional weight.

By a structure of adjusting the height of the battery provided on the battery module, the center of gravity of the handheld stand can be further finely adjusted by the knob.

The present disclosure further provides a counterweight of a handheld stand and a handheld stand, which can be implemented by the following embodiments.

1. A counterweight structure of a handheld stand, comprising a rotatable handle mechanism, a base, and a position adjusting mechanism;

wherein the rotatable handle mechanism is connected to a bottom of the base, and the base is rotatable with respect to the rotatable handle mechanism; and the position adjusting mechanism comprises a supporting plate, an adjusting knob and a device holding mechanism, wherein the supporting plate is provided with a guide rail, on which the device holding mechanism is mounted and arranged on the supporting plate, the adjusting knob is connected with the device holding mechanism and is capable of adjusting a movement of the device holding mechanism along the guide rail in an upper surface of the supporting plate, and a shooting device is held on the device holding mechanism.

2. The counterweight of a handheld stand according to item 1, wherein the device holding mechanism is connected with the adjusting knob by a screw.

3. The counterweight of a handheld stand according to item 2, wherein the position adjusting mechanism further comprises a groove member having a cuboid cavity and disposed on one end of the supporting plate for assembling with the adjusting knob; and the screw is arranged to pass through the groove member.

4. The counterweight of a handheld stand according to any one of items 1 to 3, further comprises a connecting rod and a counterweight, wherein the counterweight is disposed below the rotatable handle mechanism and connected to the base via the connecting rod, and the counterweight is configured to adjust a center of gravity of the base.

5. The counterweight of a handheld stand according to item 4, wherein the counterweight further comprises a weight, a counterweight housing and a weight adjusting mechanism arranged inside the counterweight housing, wherein the weight adjusting mechanism comprises an adjusting rod, and an adjusting knob and an adjusting block arranged at two ends of the adjusting rod, wherein the weight is fixed on the adjusting block and arranged outside the counterweight housing, the adjusting knob extends partially out of the counterweight housing through an opening of the counterweight housing, and the center of gravity of the counterweight is changed by rotating the adjusting knob to change a height of the adjusting block and the weight.

6. The counterweight of a handheld stand according to item 5, wherein the weight includes a plurality of stacked disk-shaped magnetic blocks.

7. The counterweight of a handheld stand according to item 6, wherein the weight is provided with a stepped convex shaft and a center of the adjusting block is provided with an axial hole, which is connected with the weight by the convex shaft.

8. The counterweight of a handheld stand according to item 7, wherein a mark is further arranged inside the counterweight housing for indicating the height of the adjusting block and the weight.

9. The counterweight of a handheld stand according to item 8, wherein the counterweight housing comprises a carrying portion and a covering portion, a rail is disposed in the middle of the carrying portion, the weight is connected with the adjusting block through the rail, and a fixing structure is arranged in the carrying portion for fixing the weight adjusting mechanism; and the covering portion is configured to cover the weight adjusting mechanism.

10. The counterweight of a handheld stand according to item 4, wherein the device holding mechanism comprises a fixing platform, a device holding plate and a clamping member, wherein the fixing platform is mounted on the guide rail and arranged on the supporting plate, the fixing platform is capable of moving along the guide rail, the device holding plate is connected to the fixing platform through a rotating shaft, and can be folded toward the supporting plate around the rotating shaft, and the clamping member is connected to the device holding plate via a spring connector.

Compared with the prior art, the above-described counterweight of a handheld stand and the handheld stand of the present disclosure at least has the following differences and effects.

The device holding mechanism for fixing the shooting device is arranged on the guide rail and the adjusting knob is used to adjust a position of the device holding mechanism, so that the position of the shooting device on the handheld stand can be adjusted, thereby providing an additional means for adjusting the center of gravity of the handheld stand.

The height and weight of the counterweight itself can also be adjusted, so that the center of gravity of the handheld stand can be adjusted in more ways.

The present disclosure further provides a handheld stand with a three-axis balancing assembly, which can be implemented by the following embodiments.

1. A handheld stand provided with a three-axis balancing assembly, comprising:

a rotatable handle mechanism and a base, wherein the rotatable handle mechanism comprises a handle housing and a horizontal motor arranged inside the handle housing, and a rotating shaft is fixed on a top of the horizontal motor, and a rolling motor is fixed on a top of the rotating shaft, a pitching motor and a rotating mechanism are provided inside the base, wherein the rotating mechanism comprises a first transmission gear ring and a second transmission gear ring whose axes are perpendicular to each other;

the rolling motor is connected with the first transmission gear ring through a gear engagement;

the pitching motor is connected with the second drive ring through a gear engagement; and the top of the rotating shaft is rotatably connected with the rotating mechanism.

2. The handheld stand provided with a three-axis balancing assembly according to item 1, wherein the first and second ring gears are sector rings.

3. The handheld stand provided with a three-axis balancing assembly according to item 2, wherein a sector-shaped central angle of the first transmission gear ring is between 120 and 150 degrees, a sector-shaped central angle of the second transmission gear ring is between 30 and 60 degrees.

4. The handheld stand provided with a three-axis balancing assembly according to item 1, wherein there is a preset installation angle between the rolling motor and the horizontal motor which is ranged from 10 degree to 25 degree.

5. The handheld stand provided with a three-axis balancing assembly according to item 1, wherein the top of the rotating shaft is formed as a head having a cavity, the rolling motor is fixed within the cavity, and the head is rotatably connected with the rotating mechanism.

6. The handheld stand provided with a three-axis balancing assembly according to item 5, wherein both of the rolling motor and the pitching motor are provided with a transmission pinion on their respective shafts, the rolling motor is engaged with the first transmission gear ring through the transmission pinion; and the pitching motor is engaged with the second transmission gear ring through the transmission pinion.

7. The handheld stand provided with a three-axis balancing assembly according to any one of items 1 to 6, further comprises a position adjusting mechanism provided on the upper surface of the base for holding the shooting device and adjusting a position of the shooting position relative to the base.

8. The handheld stand provided with a three-axis balancing assembly according to any one of items 1 to 6, further comprises a counterweight disposed below the rotatable handle mechanism and is connected with the base by a connecting rod, wherein the counter weight is configured to adjust a center of gravity of the base.

9. The handheld stand provided with a three-axis balancing assembly according to any one of items 1 to 6, further comprises:

an inertial measurement unit for measuring a three-axis attitude angle and acceleration; and a control circuit is electrically connected with the inertial measurement unit, generates a three-way control electric signals according to the three-axis attitude angle and the acceleration output by the inertial measurement unit, and outputs the three-way control electric signals respectively to the horizontal motor, the rolling motor and the pitching motor.

10. The handheld stand provided with a three-axis balancing assembly according to item 9, wherein the inertial measurement unit comprises a gyroscope and an accelerometer.

Compared with the prior art, the handheld stand provided with a three-axis balancing assembly of the present disclosure has at least the following differences and effects.

Angles in three mutually perpendicular directions can be effectively adjusted by three motors in order to achieve a three-axis balance. The base can be rotated in the horizontal plane at any angle. In the other two directions, the rotatable angle of the base can be controlled within a certain range by setting the central angles of the sector-shaped gear ring as required, reducing the risk of falling off of mobile phones and other equipment from the stand.

The handheld stand of the present disclosure can more effectively maintain the stability of the shooting device, avoid the influence of a hand shake of an operator on shooting quality, and improve the shooting quality, and thus has a very broad application prospect.

The present disclosure also provides a lockable and foldable structure and a handheld stand comprising the structure for a shooting device, which can be implemented by the following embodiments.

1. A lockable and foldable structure for a shooting device, comprising a supporting plate and a device holding mechanism, wherein the supporting plate is provided with a guide rail and a groove;

the device holding mechanism includes a fixing platform, a device holding plate and a clamping member, wherein the device holding plate is mounted with the guide rail, arranged on the supporting plate and movable along the guide rail, the device holding plate is connected to the fixing platform through a rotating shaft and is foldable toward the supporting plate about the rotating shaft, and the clamping member is connected to the device holding plate via a spring connector; and in a storage state, the device holding plate is folded to be parallel to the supporting plate, and the clamping member is engaged and locked with the groove; in use, the device holding plate is folded to form a preset angle relative to the supporting plate, and the shooting device is abutted against the device holding plate and is clamped between the clamping member and the fixing platform.

2. The lockable and foldable structure according to item 1, further comprises an adjusting knob which is connected to the device holding mechanism by a screw, wherein the adjusting knob is rotated to rotate the screw so as to move the device holding mechanism along the guide rail in a horizontal direction.

3. The lockable and foldable structure according to item 2, further includes a groove member having a cuboid cavity, disposed on one end of the supporting plate for assembling with the adjusting knob, wherein the screw passes through the groove member.

4. The lockable and foldable structure according to item 1, wherein the supporting plate is provided with a length-readable area between the guide rails, and the length-readable area extends over a length approximately most of a length of the guide rails along an axis of symmetry of the supporting plate.

5. The lockable and foldable structure according to item 1, wherein the fixing platform comprises a base portion, a fixture, and a protrusion, wherein a lower surface of the base portion is provided with grooves symmetrical to a symmetrical axis of the base portion;

the fixture is provided on an upper surface of the base portion, is symmetrical to the symmetrical axis of the base portion, projects upward perpendicularly to the upper surface of the base portion and configured to engage with the device holding plate; and the protrusion is fixed on a side of the base portion close to the groove member for assembling with the adjusting knob.

6. The lockable and foldable structure according to item 5, wherein the fixing platform is provided with an inclined protrusion for abutting the shooting device at the middle thereof, an upper surface of inclined protrusion is not parallel to that of the fixing platform.

7. The lockable and foldable structure according to item 1, wherein the spring connector comprises:

a connecting rod, one end of which is arranged inside the clamping member and the other end of which extends into two opposite sides of the device holding plate; and a spring which is mounted on the connecting rod, one end of the spring is connected to the device holding plate and the other end of the spring is connected to the clamping member, such that the clamping is elastically connected with the device holding plate.

8. A handheld stand, comprising: a rotatable handle mechanism, a base and a position adjusting mechanism;

the rotatable handle mechanism is connected to a bottom of the base, and the base is rotatable relative to the rotatable handle mechanism; and the position adjusting mechanism comprising the structure according to any one of items 1 to 7.

9. The handheld stand according to item 8, further comprises a connecting rod and a counterweight;

wherein the counterweight is disposed below the rotatable handle mechanism and connected to the base through the connecting rod; and the counterweight is configured to adjust a center of gravity of the base.

10. The handheld stand according to item 9, wherein the base is connected to the counterweight by two parallel connecting rods, each of the connecting rods comprises a first connecting rod and a second connecting rod connected by a pivoting mechanism; and in a storage state, the second connecting rod is foldable about the pivoting mechanism to one end of the base, and the rotatable handle mechanism is rotated to abut against the other end of the base and received within a space defined by the two folded connecting rods.

Compared with the prior art, the above-mentioned structure integrated with a snap and folded function of a shooting device and the handheld stand of the present disclosure has the following advantages and effects.

The shooting device can be securely held in use, and the device holding plate can be locked and will not be unexpectedly deployed due to an external force in the storage state.

The front and rear position of the shooting device can be adjusted by the adjusting knob to adjust the center of gravity of the handheld stand, so that a three-axis balance of the handheld stand can be achieved with a smaller torque of a motor.

The present disclosure also provides a method for adjusting the center of gravity of a handheld stand, which can be implemented by the following embodiments.

1. A method for adjusting a center of gravity of a handheld stand, comprising steps of:

sending torque information of motor(s) in a balance state to a mobile terminal, after the handheld stand is balanced;

displaying the received torque information of motor(s) by the mobile terminal;

adjusting a counterweight of the handheld stand to change a position of the center of gravity of the handheld stand according to the torque information of motor(s) displayed by the mobile terminal; and repeatedly performing the above steps at least once so that an absolute value of the torque information of motor(s) displayed by the mobile terminal becomes smaller.

2. The method for adjusting the center of gravity of a handheld stand according to item 1, wherein the handheld stand includes three motors for respectively adjusting the balance of the handheld stand in three orthogonal axes, and the torque information of motors includes torque information of two motors in the three motors which are configured to adjust the balance of a platform about the two orthogonal axes in a horizontal plane.

3. The method for adjusting the center of gravity of a handheld stand according to item 2, wherein the handheld stand further comprises:

an inertial measurement unit for measuring and outputting a three-axis attitude angle and acceleration of the handheld stand; and a control circuit configured to control the torque of the three motors according to information output by the inertial measurement unit to reach a balance state.

4. The method for adjusting the center of gravity of a handheld stand according to item 3, wherein in the step of displaying the received torque information of motor(s) by the mobile terminal, the mobile terminal displays magnitudes and directions of the torques by use of a horizontal bubble meter, according to the information of two motors which are configured to adjust the balance of the platform about the two orthogonal axes in the horizontal plane.

5. The method for adjusting the center of gravity of a handheld stand according to item 1, wherein prior to the step of sending the torque information of motor(s) in a balance state to the mobile terminal, the method further comprises a step of establishing a wireless connection between the handheld stand and the mobile terminal.

6. The method for adjusting the center of gravity of a handheld stand according to any one of items 1 to 5, wherein the handheld stand includes a rotatable handle mechanism, a base, a position adjusting mechanism, a connecting rod and a counterweight; wherein, the rotatable handle mechanism is connected to a bottom of the base, and the base is rotatable with respect to the rotatable handle mechanism;

the position adjusting mechanism is disposed on an upper surface of the base for holding a shooting device and adjusting a position of the shooting device relative to the base; and the counterweight is disposed below the rotatable handle mechanism and connected to the base via the connecting rod.

7. The method for adjusting the center of gravity of a handheld stand according to item 6, wherein the position adjusting mechanism comprises a supporting plate, a adjusting knob and a device holding mechanism, wherein the supporting plate is provided with a guide rail, the device holding mechanism is mounted on the guide rail and is arranged on the supporting plate, the adjustment knob is connected to the device holding mechanism and is capable of adjusting the device holding mechanism to move along the guide rail in the upper surface of the base, and the shooting device is held on a the device holding mechanism.

8. The method for adjusting the center of gravity of a handheld stand according to item 7, wherein the step of adjusting the counterweight of the handheld stand further comprises a step of adjusting a position of the device holding mechanism in the support plate by the adjusting knob to change the position of the center of gravity of the handheld stand.

9. The method for adjusting the center of gravity of a handheld stand according to item 7, wherein the counterweight comprises a weight, a counterweight housing and a weight adjusting mechanism arranged inside the counterweight housing;

the weight adjusting mechanism comprises an adjusting rod and an adjusting knob and an adjusting block arranged at two ends of the adjusting rod, the weight is fixed on the adjusting block and is arranged outside the counterweight housing, and the adjusting knob extends partially out of the counterweight housing via an opening; and the weight includes multiple stacked disc-shaped magnetic blocks.

10. The method for adjusting the center of gravity of a handheld stand according to item 9, wherein the step of adjusting the counterweight of the handheld stand comprises steps of:

rotating the adjusting knob to change a height of the adjusting block and the weight so as to change a center of gravity of the counterweight; and increasing or decreasing the number of disk-shaped magnetic blocks of the weight to change the center of gravity of the counterweight.

Compared with the prior art, the method for adjusting the center of gravity of the handheld stand of the present disclosure at least has the following differences and effects.

The handheld stand sends the torque information of motor(s) in a balance state to the mobile terminal for display. According to the information displayed, the counterweight of the handheld stand can be adjusted to quickly adjust the handheld stand into a balance state with a minimum torque of motor(s), avoiding an overheating and a high energy consumption of the motor(s) due to outputting a large torque over a long time period.

Further, the magnitude and direction of the torque of motor(s) can be shown visually and intuitively by the horizontal bubble meter.

The present disclosure also provides a foldable component and a handheld stand, which can be implemented by the following embodiments.

1. A foldable member, comprising: a first connecting rod and a second connecting rod, wherein one end of the first connecting rod is provided with a middle connecting sheet, one end of the second connecting rod is provided with a first and a second connecting sheets, the first connecting sheet, the middle connecting sheet and the second connecting sheet are connected together through a rotating shaft; and a locking assembly is respectively disposed between the first connecting sheet and the middle connecting sheet and between the middle connecting sheet and the second connecting sheet; the locking assembly comprises two ring pieces and an elastic piece; the elastic piece is configured to force two opposing faces respective from the two ring pieces to closely engage with each other by its elasticity; one of the two opposing faces of the ring pieces includes a plurality of protrusions and the other face includes a plurality of depressions, and the depressions and the protrusions match with each other in shape; and one of two faces of the two ring pieces that do not engage with each other is fixedly connected to the middle connecting sheet and the other one is fixedly connected to the first connecting sheet or the second connecting sheet.

2. The foldable member according to item 1, wherein the elastic piece is a wave washer.

3. The foldable member according to item 1, wherein the elastic piece is an elastic rubber ring.

4. The foldable member according to item 1, wherein the elastic piece is disposed between the ring piece and the middle connecting sheet.

5. The foldable member according to item 1, wherein the elastic piece is disposed between the ring piece and the first connecting plate, or the elastic piece is disposed between the ring piece and the second connecting sheet.

6. The foldable member according to item 1, wherein the ring piece is formed as a wear-resistant reinforcement.

7. The foldable member according to item 1, wherein the second connecting rod is formed by two symmetrical halves, one of the halves is provided with the first connecting sheet and the other half is provided with the second connecting sheet.

8. The foldable member according to item 1, wherein the rotating shaft consists of a screw and a nut, the two opposing faces respective from the two ring pieces of the locking assembly are closely engaged with each other by fastening of the screw and the nut and the elasticity of the elastic piece.

9. The foldable member according to item 1, wherein two decorative pieces are provided at both ends of the rotating shaft.

10. A handheld stand, comprising: a rotatable handle mechanism, a base, and a counterweight;

the rotatable handle mechanism is connected to a bottom of the base, and the rotatable handle mechanism is rotatable in any direction relative to the base;

the counterweight is arranged below the rotatable handle mechanism; and the base and the counterweight is connected by the foldable member according to any one of items 1 to 9, wherein the other end of the first connecting rod of the foldable member is connected with the base, and the other end of the second connecting rod is connected with the counterweight.

Compared with the prior art, the above-mentioned foldable member and the handheld stand of the present disclosure have at least the following differences and effects. A stable state can be achieved when the two connecting rods are rotated relative to each other by a certain angle, and a rotatable state can be achieved again only when an external force is large enough. Moreover, multiple stable states can be achieved with the two connecting rods rotated relative to each other by multiple angles.

It should be noted that, in this patent application, the terms such as first and second are merely used to distinguish one entity or operation from another entity or operation, and do not necessarily require or imply that there are any such actual relationships or orders between entities or operations. Moreover, terms "include", "comprise" or any other variations thereof are intended to cover a non-exclusive inclusion such that a process, method, article, or apparatus that includes a list of elements includes not only those elements but also non-listed elements or other elements that are inherent to such process, method, article, or apparatus. Without further limitations, an element defined by "including one" is not intended to exclude additional elements that are common to the process, method, article, or apparatus that includes the element. In this patent application, reference to performing an action on the basis of an element means at least the meaning of performing the action on the basis of the element, including two cases where the action is performed only on the basis of the element and where the action is performed on the basis of the element and other elements.

All references mentioned in the present application are incorporated herein by reference, as if each reference was individually incorporated by reference. In addition, it should be understood that after reading the above teachings of the present disclosure, those skilled in the art can make various modifications or alterations to the present disclosure, and such equivalents also fall within the protection scope of the present disclosure.

What is claimed is:

1. A handheld stand for shooting, comprising a rotatable handle mechanism, a base, a position adjusting mechanism, a connecting mechanism and a counterweight, wherein
the rotatable handle mechanism is connected to a bottom of the base, and the base is rotatable with respect to the rotatable handle mechanism;
the position adjusting mechanism is disposed on an upper surface of the base for holding a shooting device and adjusting a position of the shooting device relative to the base;
the counterweight is disposed below the rotatable handle mechanism and connected to the base via the connecting mechanism, and
the counterweight is configured to adjust a center of gravity of the base,
wherein in a storage state of the handheld stand, the rotatable handle mechanism is rotated to be folded to and abut against the bottom of the base.

2. The handheld stand for shooting according to claim 1, wherein
the connecting mechanism is foldable; and
in a storage state of the handheld stand, the connecting mechanism is folded to the bottom of the base.

3. The handheld stand for shooting according to claim 2, wherein
the connecting mechanism is formed as a connecting rod comprising a first connecting rod and a second connecting rod connected by a pivoting mechanism; and
in the storage state, the second connecting rod is foldable about the pivoting mechanism to one end of the base, and the rotatable handle mechanism is rotated to abut against an opposite end of the base and received within a space defined by the folded connecting rod.

4. The handheld stand for shooting according to claim 3, wherein
the rotating mechanism comprises a middle connecting sheet provided on one end of the first connecting rod, and a first and second connecting sheets provided on one end of the second connecting rod, and the first connecting sheet, the middle connecting sheet and the second connecting sheet are connected together in order through a rotating shaft; and
the pivoting mechanism further comprises a locking assembly respectively disposed between the first connecting sheet and the middle connecting sheet and between the middle connecting sheet and the second connecting sheet, wherein the locking assembly is configured to define multiple stable states at multiple angles during a rotation process of the second connecting rod about the pivoting mechanism.

5. The handheld stand for shooting according to claim 4, wherein
the inserted assembly comprises two ring pieces and an elastic piece; the elastic piece is configured to force two opposing faces respective from the two ring pieces closely engage with each other; one of the two opposing faces of the two ring pieces includes a plurality of protrusions and the other face includes a plurality of depressions shaped correspondingly to the protrusions; and one of two faces of the ring pieces that do not engage with each other is fixedly connected to the middle connecting sheet and the other face is fixedly connected to the first connecting sheet or the second connecting sheet.

6. The handheld stand for shooting according to claim 1, wherein
the counterweight comprises a weight, a counterweight housing and a weight adjusting mechanism arranged inside the counterweight housing; and
the weight adjusting mechanism comprises an adjusting rod, and an adjusting knob and an adjusting block arranged at two ends of the adjusting rod, the weight is fixed on the adjusting block and arranged outside the counterweight housing, the adjusting knob extends partially out of the counterweight housing, and the center of gravity of the counterweight is changed by rotating the adjusting knob so as to change a height of the adjusting block and the weight.

7. The handheld stand for shooting according to claim 1, wherein the counterweight is formed as a battery module for supplying electrical power to the handheld stand.

8. The handheld stand for shooting according to claim 1, wherein
the position adjusting mechanism comprises a supporting plate, an adjusting knob and a device holding mechanism, a guide rail is arranged on the supporting plate, the device holding mechanism is mounted on the guide rail and arranged on the supporting plate, the adjusting knob is connected with the device holding mechanism and is capable of adjusting a movement of the device holding mechanism along the guide rail, and the shooting device is held on the device holding mechanism.

9. The handheld stand for shooting according to claim 1, wherein the rotatable handle mechanism comprises a handle housing and a horizontal motor arranged inside the handle housing, a top of the horizontal motor is fixed with a rotating shaft, and a top of the rotating shaft is fixed with a rolling motor,
a pitching motor and a rotating mechanism are provided within the base, wherein the rotating mechanism comprises a first transmission gear ring and a second transmission gear ring whose axes are perpendicular to each other;
the rolling motor is connected with the first transmission gear ring through a gear engagement;
the pitching motor is connected with the second transmission gear ring through a gear engagement; and
the top of the rotating shaft is simultaneously rotatably connected with the rotating mechanism.

10. The handheld stand for shooting according to claim 1, further comprises a supporting plate and a device holding mechanism, wherein
the supporting plate is provided with a guide rail and a groove;
the device holding mechanism comprises a fixing platform, a device holding plate and a clamping member, wherein the device holding plate is mounted on the guide rail, arranged on the supporting plate and movable along the guide rail, the device holding plate is rotatably connected to the fixing platform and is foldable toward the supporting plate, and the clamping member is connected to the device holding plate through a spring connector; and in a storage state, the device holding plate is folded to be parallel to the supporting plate, and the clamping member is engaged and locked with the groove; in use, the device holding plate is folded to form a preset angle relative to the supporting plate, and the shooting device is clamped between the clamping member and the fixing platform, and abuts against the device holding plate.

11. A method for adjusting a center of gravity of a handheld stand, comprising steps of:
    sending torque information of motor(s) in a balance state to a mobile terminal, after the handheld stand is balanced;
    displaying the received torque information of motor(s) by the mobile terminal;
    adjusting a counterweight of the handheld stand to change a position of the center of gravity of the handheld stand according to the torque information of motor(s) displayed by the mobile terminal; and
    repeatedly performing the above steps at least once so that absolute value(s) of the torque information of motor(s) displayed by the mobile terminal becomes smaller.

12. The method for adjusting the center of gravity of a handheld stand according to claim 11, wherein the handheld stand includes three motors for respectively adjusting the balance of the handheld stand in three orthogonal axes, and the torque information of motor(s) includes torque information of two motors in the three motors which are configured to perform balance adjustment about two orthogonal axes in a horizontal plane.

13. The method for adjusting the center of gravity of a handheld stand according to claim 12, wherein the handheld stand further comprises:
    an inertial measurement unit for measuring and outputting a three-axis attitude angle and acceleration of the handheld stand; and
    a control circuit configured to control the torques of the three motors according to information output by the inertial measurement unit to reach a balance state.

14. The method for adjusting the center of gravity of a handheld stand according to claim 13, wherein in the step of displaying the received torque information of motor(s) by the mobile terminal, the mobile terminal displays magnitudes and directions of the torques by use of a horizontal bubble meter, according to the information of the two motors which are configured to perform balance adjustment about two orthogonal axes in a horizontal plane.

15. The method for adjusting the center of gravity of a handheld stand according to claim 11, wherein prior to the step of sending the torque information of motor(s) in a balance state to the mobile terminal, the method further comprises a step of establishing a wireless connection between the handheld stand and the mobile terminal.

16. The method for adjusting the center of gravity of a handheld stand according to claim 11, wherein the handheld stand includes a rotatable handle mechanism, a base, a position adjusting mechanism, a connecting rod and a counterweight; wherein,
    the rotatable handle mechanism is connected to a bottom of the base, and the base is rotatable with respect to the rotatable handle mechanism;
    the position adjusting mechanism is disposed on an upper surface of the base for holding a shooting device and adjusting a position of the shooting device relative to the base; and
    the counterweight is disposed below the rotatable handle mechanism and connected to the base via the connecting rod.

17. The method for adjusting the center of gravity of a handheld stand according to claim 16, wherein the position adjusting mechanism comprises a supporting plate, a adjusting knob and a device holding mechanism, wherein the supporting plate is provided with a guide rail, the device holding mechanism is mounted on the guide rail and is arranged on the supporting plate, the adjustment knob is connected to the device holding mechanism and is capable of moving the device holding mechanism along the guide rail, and the shooting device is held on a the device holding mechanism.

18. The method for adjusting the center of gravity of a handheld stand according to claim 17, wherein the step of adjusting the counterweight of the handheld stand further comprises a step of adjusting a position of the device holding mechanism relative to the support plate by the adjusting knob to change the position of the center of gravity of the handheld stand.

19. The method for adjusting the center of gravity of a handheld stand according to claim 17, wherein the counterweight comprises a weight, a counterweight housing and a weight adjusting mechanism arranged inside the counterweight housing;
    the weight adjusting mechanism comprises an adjusting rod and an adjusting knob and an adjusting block arranged at two ends of the adjusting rod, the weight is fixed on the adjusting block and is arranged outside the counterweight housing, and the adjusting knob extends partially out of the counterweight housing via an opening; and
    the weight includes multiple stacked disc-shaped magnetic blocks.

20. The method for adjusting the center of gravity of a handheld stand according to claim 19, wherein the step of adjusting the counterweight of the handheld stand comprises steps of:
    rotating the adjusting knob to change a height of the adjusting block and the weight so as to change a center of gravity of the counterweight; and
    increasing or decreasing the number of disk-shaped magnetic blocks of the weight to change the center of gravity of the counterweight.

* * * * *